(12) United States Patent
Lenke

(10) Patent No.: US 11,090,220 B2
(45) Date of Patent: *Aug. 17, 2021

(54) STIMULATION DEVICE

(71) Applicant: NOVOLUTO GmbH, Berlin (DE)

(72) Inventor: Michael Lenke, Metten (DE)

(73) Assignee: NOVOLUTO GBHH, Berlin (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/965,117

(22) Filed: Apr. 27, 2018

(65) Prior Publication Data

US 2018/0243161 A1 Aug. 30, 2018

Related U.S. Application Data

(63) Continuation of application No. 15/354,599, filed on Nov. 17, 2016, which is a continuation of application
(Continued)

(30) Foreign Application Priority Data

Sep. 23, 2013 (DE) .......................... 102013110501.7

(51) Int. Cl.
   *A61H 19/00* (2006.01)
   *A61H 9/00* (2006.01)
(52) U.S. Cl.
   CPC .............. *A61H 19/34* (2013.01); *A61H 9/00* (2013.01); *A61H 9/005* (2013.01); *A61H 9/0007* (2013.01);
(Continued)
(58) Field of Classification Search
   CPC .. A61H 9/00; A61H 9/005; A61H 2009/0064; A61H 19/30; A61H 19/34;
(Continued)

(56) References Cited

U.S. PATENT DOCUMENTS

| 15,626 A | 8/1856 | Tillotson |
| 787,443 A | 4/1905 | Godman et al. |

(Continued)

FOREIGN PATENT DOCUMENTS

| AU | 2011351297 | 7/2013 |
| AU | 2018200317 | 2/2018 |

(Continued)

OTHER PUBLICATIONS

"Can.", Thefreedictionary.com, The free dictionary by Farlex, 2016, Dec. 26, 2016, 1 pg.
(Continued)

*Primary Examiner* — Michael J Tsai
(74) *Attorney, Agent, or Firm* — Hanley, Flight & Zimmerman, LLC

(57) ABSTRACT

A stimulation device is provided in accordance with one embodiment. The stimulation device includes a chamber which has a flexible wall portion. A drive unit of the stimulation device is in physical communication with the flexible wall portion so as to cause deflections of the flexible wall portion in opposing directions, thereby resulting in a changing volume of the chamber. The changing volume of the chamber results in modulated positive and negative pressures with respect to a reference pressure. An opening of the stimulation device is for applying the modulated positive and negative pressures to a body part. The stimulation device includes a control device for controlling the drive unit.

31 Claims, 7 Drawing Sheets

Related U.S. Application Data

No. 15/023,471, filed as application No. PCT/EP2014/065734 on Jul. 22, 2014, now Pat. No. 9,763,851.

(52) U.S. Cl.
CPC ............ *A61H 9/0057* (2013.01); *A61H 19/00* (2013.01); *A61H 19/30* (2013.01); *A61H 2201/0153* (2013.01); *A61H 2201/0157* (2013.01); *A61H 2201/1207* (2013.01); *A61H 2201/1215* (2013.01); *A61H 2201/1238* (2013.01); *A61H 2201/1409* (2013.01)

(58) Field of Classification Search
CPC .... A61H 19/50; A61H 23/02; A61H 23/0254; A61H 2205/087
See application file for complete search history.

(56) References Cited

U.S. PATENT DOCUMENTS

| | | | |
|---|---|---|---|
| 809,810 | A | 1/1906 | Jost |
| 847,360 | A | 3/1907 | Osius |
| 1,042,058 | A * | 10/1912 | Von Hook ............ A61F 11/00 340/388.3 |
| 1,378,922 | A * | 5/1921 | Ward ............ A61H 9/005 601/10 |
| 1,502,440 | A * | 7/1924 | Robert ............ A61H 9/005 601/65 |
| 1,730,535 | A | 10/1929 | Rudolph |
| 1,732,310 | A | 10/1929 | Naibert |
| 1,805,675 | A | 5/1931 | Rudolph |
| 1,882,040 | A * | 10/1932 | Roehm ............ A61H 9/005 601/10 |
| 1,898,652 | A | 2/1933 | Williams |
| 1,914,290 | A | 6/1933 | Popkin |
| 1,941,665 | A | 1/1934 | De Walt |
| 1,964,590 | A | 6/1934 | Friederich |
| 1,998,696 | A | 4/1935 | Andis |
| 2,017,284 | A | 10/1935 | Lembright |
| 2,052,098 | A | 8/1936 | Lockett |
| 2,064,418 | A | 12/1936 | Derringer |
| 2,076,410 | A | 4/1937 | McGerry |
| 2,112,646 | A * | 3/1938 | Biederman ............ A61H 9/005 601/6 |
| 2,154,427 | A | 4/1939 | Andres |
| 2,189,116 | A | 2/1940 | Niemiec |
| 2,218,081 | A | 10/1940 | Brichieri-Colombi et al. |
| 2,218,443 | A | 10/1940 | Tweddle |
| 2,234,102 | A * | 3/1941 | Andres ............ A61H 9/005 601/101 |
| 2,314,590 | A | 3/1943 | McCarty |
| 2,470,660 | A | 5/1949 | Snyder |
| 2,519,790 | A | 8/1950 | Quinn |
| 2,561,034 | A | 7/1951 | Phillips |
| 2,661,736 | A | 12/1953 | Schwartz |
| 2,674,994 | A | 4/1954 | Murphy |
| 3,396,720 | A | 8/1968 | Shigeyuki |
| 3,818,904 | A | 6/1974 | Kawada |
| 3,906,940 | A * | 9/1975 | Kawada ............ A61H 7/005 601/6 |
| 3,910,262 | A | 10/1975 | Stoughton |
| 4,088,128 | A | 5/1978 | Mabuchi |
| 4,203,431 | A | 5/1980 | Abura et al. |
| 4,312,350 | A | 1/1982 | Doan |
| 4,428,368 | A | 1/1984 | Torii |
| 4,813,403 | A | 3/1989 | Endo |
| 4,900,316 | A | 2/1990 | Yamamoto |
| 5,003,966 | A | 4/1991 | Saka et al. |
| D323,034 | S | 1/1992 | Reinstein |
| D329,563 | S | 9/1992 | Rasmussen |
| 5,336,158 | A | 8/1994 | Huggins et al. |
| D351,236 | S | 10/1994 | Held |
| 5,377,701 | A * | 1/1995 | Fang ............ A61H 9/005 132/212 |
| 5,377,702 | A | 1/1995 | Sakurai |
| D359,563 | S | 6/1995 | Chi |
| 5,501,650 | A | 3/1996 | Gellert |
| 5,593,381 | A | 1/1997 | Tannenbaum et al. |
| 5,647,837 | A | 7/1997 | McCarty |
| 5,662,593 | A | 9/1997 | Tillman et al. |
| 5,690,603 | A | 11/1997 | Kain |
| 5,693,002 | A | 12/1997 | Tucker et al. |
| 5,725,473 | A | 3/1998 | Taylor |
| 5,813,973 | A | 9/1998 | Gloth |
| D402,905 | S | 12/1998 | Kanza et al. |
| D414,582 | S | 9/1999 | Hwang |
| D419,893 | S | 2/2000 | Cheng |
| 6,099,463 | A | 8/2000 | Hockhalter |
| 6,319,211 | B1 | 11/2001 | Ito et al. |
| D463,862 | S | 10/2002 | Lau |
| 6,464,653 | B1 | 10/2002 | Hovland et al. |
| 6,517,511 | B2 * | 2/2003 | Yao ............ A61M 1/0049 604/315 |
| D478,385 | S | 8/2003 | Dirks et al. |
| 6,666,875 | B1 | 12/2003 | Sakurai et al. |
| 6,723,060 | B2 | 4/2004 | Miller |
| 6,733,438 | B1 * | 5/2004 | Dann ............ A61H 19/34 600/38 |
| 6,758,826 | B2 | 7/2004 | Luettgen et al. |
| D509,301 | S | 9/2005 | Talbot et al. |
| 6,949,067 | B1 * | 9/2005 | Dann ............ A61H 19/34 600/38 |
| D510,441 | S | 10/2005 | Harris, Jr. et al. |
| 6,964,643 | B2 | 11/2005 | Hovland et al. |
| D523,561 | S | 6/2006 | Telford |
| D523,562 | S | 6/2006 | Telford |
| D523,963 | S | 6/2006 | Telford |
| 7,079,898 | B2 | 7/2006 | Cohn |
| D545,446 | S | 6/2007 | Wu |
| 7,318,811 | B1 | 1/2008 | Corbishley |
| 7,534,203 | B2 | 5/2009 | Gil |
| D609,361 | S | 2/2010 | McGarry et al. |
| D612,510 | S | 3/2010 | Byle |
| 7,682,321 | B2 | 3/2010 | Naldoni |
| D613,417 | S | 4/2010 | Imboden et al. |
| D621,950 | S | 8/2010 | Seki et al. |
| 7,828,717 | B2 | 11/2010 | Lee |
| D637,308 | S | 5/2011 | Imboden et al. |
| D637,309 | S | 5/2011 | Park |
| 7,967,740 | B2 | 6/2011 | Mertens et al. |
| D649,657 | S | 11/2011 | Petersen et al. |
| D652,523 | S | 1/2012 | Bradley et al. |
| 8,147,399 | B2 | 4/2012 | Gloth |
| D665,091 | S | 8/2012 | Mistry et al. |
| D666,303 | S | 8/2012 | Ding et al. |
| D671,226 | S | 11/2012 | Aulwes et al. |
| 8,382,656 | B1 | 2/2013 | Brown |
| D681,225 | S | 4/2013 | Chen |
| D681,842 | S | 5/2013 | Chang |
| D689,382 | S | 9/2013 | Juhng et al. |
| D692,570 | S | 10/2013 | Luzon et al. |
| 8,568,342 | B2 | 10/2013 | Shaviv |
| D693,247 | S | 11/2013 | Juhng et al. |
| 8,579,837 | B1 | 11/2013 | Makower et al. |
| D704,345 | S | 5/2014 | Tai |
| D706,440 | S | 6/2014 | Hahr et al. |
| D706,441 | S | 6/2014 | Hahr et al. |
| D706,444 | S | 6/2014 | Hahr et al. |
| D708,440 | S | 7/2014 | Owen et al. |
| 8,821,421 | B2 | 9/2014 | Imboden et al. |
| D723,707 | S | 3/2015 | Matsuura |
| D723,711 | S | 3/2015 | Elliott |
| 9,022,925 | B2 | 5/2015 | Nan |
| RE45,585 | E | 6/2015 | Peddicord |
| D739,951 | S | 9/2015 | Tai |
| 9,132,058 | B2 | 9/2015 | Imboden et al. |
| D759,256 | S | 6/2016 | Chen |
| D759,261 | S | 6/2016 | Son et al. |
| RE46,163 | E | 9/2016 | Peddicord |
| D768,309 | S | 10/2016 | Hetzel |
| D768,310 | S | 10/2016 | Hetzel |
| D771,389 | S | 11/2016 | Since |
| D771,828 | S | 11/2016 | Sedic |

(56) References Cited

U.S. PATENT DOCUMENTS

| | | |
|---|---|---|
| D772,419 S | 11/2016 | Courtion et al. |
| D773,061 S | 11/2016 | Loebel et al. |
| D773,065 S | 11/2016 | Driscoll et al. |
| 9,486,388 B2 | 11/2016 | Wright, Jr. |
| 9,498,404 B2 | 11/2016 | Murison |
| D773,160 S | 12/2016 | Mokos et al. |
| D773,823 S | 12/2016 | Wong |
| D793,571 S | 8/2017 | Iurchenko |
| D794,854 S | 8/2017 | Zepter |
| D796,054 S | 8/2017 | Chen |
| D796,055 S | 8/2017 | Chen |
| 9,737,457 B2 | 8/2017 | Allen |
| 9,737,458 B1 | 8/2017 | Olivares et al. |
| D797,302 S | 9/2017 | Vahlensieck et al. |
| 9,763,851 B2 | 9/2017 | Lenke |
| D802,784 S | 11/2017 | Lee |
| D804,332 S | 12/2017 | Lim et al. |
| D805,781 S | 12/2017 | Szymanski et al. |
| 9,849,061 B2 | 12/2017 | Lenke |
| D809,150 S | 1/2018 | Nolasco et al. |
| D809,170 S | 1/2018 | Marzynski |
| 9,855,186 B2 | 1/2018 | Goldenberg et al. |
| D809,945 S | 2/2018 | Prommel et al. |
| 9,937,097 B2 | 4/2018 | Lenke |
| D822,843 S | 7/2018 | Lenke |
| D825,073 S | 8/2018 | Lenke |
| 10,085,913 B2 | 10/2018 | Blenk et al. |
| 10,857,063 B2 | 12/2020 | Lenke |
| 2001/0041848 A1 | 11/2001 | Ito et al. |
| 2002/0120219 A1* | 8/2002 | Hovland ............ A61F 5/48 |
| | | 601/6 |
| 2002/0198488 A1 | 12/2002 | Yao |
| 2003/0114804 A1 | 6/2003 | Putzer |
| 2003/0176817 A1 | 9/2003 | Chang |
| 2004/0102822 A1 | 5/2004 | Cohn |
| 2004/0193079 A1 | 9/2004 | Siddhartha |
| 2004/0236254 A1 | 11/2004 | Nichols |
| 2004/0260209 A1 | 12/2004 | Ella et al. |
| 2004/0260212 A1 | 12/2004 | Cho |
| 2005/0159684 A1 | 7/2005 | Ikadai |
| 2005/0159760 A1* | 7/2005 | Ikadai ............ A61H 9/005 |
| | | 606/131 |
| 2005/0203446 A1 | 9/2005 | Takashima |
| 2006/0089572 A1 | 4/2006 | Byon |
| 2006/0116612 A1 | 6/2006 | Drysdale |
| 2007/0100259 A1 | 5/2007 | Nan |
| 2007/0185553 A1 | 8/2007 | Kennedy |
| 2008/0071138 A1 | 3/2008 | Mertens et al. |
| 2008/0091060 A1 | 4/2008 | Heilman |
| 2008/0106896 A1 | 5/2008 | Liu et al. |
| 2008/0275386 A1 | 11/2008 | Myers |
| 2008/0304984 A1* | 12/2008 | Chan ............ A61H 9/0057 |
| | | 417/415 |
| 2008/0312674 A1 | 12/2008 | Chen et al. |
| 2009/0038069 A1 | 2/2009 | Heilman |
| 2009/0048581 A1 | 2/2009 | Sebban |
| 2009/0099413 A1 | 4/2009 | Kobashikawa et al. |
| 2009/0118573 A1 | 5/2009 | Tsao |
| 2009/0275796 A1 | 11/2009 | Gil |
| 2009/0306577 A1 | 12/2009 | Akridge et al. |
| 2010/0056963 A1 | 3/2010 | Shaviv |
| 2010/0298745 A1 | 11/2010 | Liu et al. |
| 2011/0034837 A1 | 2/2011 | Lee |
| 2011/0098613 A1 | 4/2011 | Thomas et al. |
| 2011/0230802 A1 | 9/2011 | Nan |
| 2011/0295162 A1 | 12/2011 | Chang et al. |
| 2012/0330097 A1 | 12/2012 | Lee |
| 2013/0012769 A1 | 1/2013 | Carlson |
| 2013/0116503 A1 | 5/2013 | Mertens et al. |
| 2013/0226050 A1 | 8/2013 | Lee |
| 2013/0237751 A1 | 9/2013 | Alexander |
| 2013/0261385 A1 | 10/2013 | Zipper |
| 2014/0046127 A1 | 2/2014 | Topolovac et al. |
| 2014/0088351 A1 | 3/2014 | Murison |
| 2014/0088468 A1 | 3/2014 | Murison |
| 2014/0088470 A1 | 3/2014 | Topolovac et al. |
| 2014/0135798 A1 | 5/2014 | David |
| 2014/0142374 A1 | 5/2014 | Makower et al. |
| 2014/0179994 A1 | 6/2014 | Topolovac et al. |
| 2014/0194794 A1 | 7/2014 | Sedic |
| 2014/0236151 A1 | 8/2014 | Lee |
| 2014/0309565 A1 | 10/2014 | Allen |
| 2014/0350333 A1 | 11/2014 | Stout |
| 2015/0105609 A1 | 4/2015 | Jochum |
| 2015/0133832 A1 | 5/2015 | Colette et al. |
| 2015/0133833 A1 | 5/2015 | Bradley et al. |
| 2015/0164678 A1 | 6/2015 | Lee et al. |
| 2015/0196455 A1 | 7/2015 | Mertens et al. |
| 2015/0328081 A1 | 11/2015 | Goldenberg et al. |
| 2015/0351999 A1 | 12/2015 | Brouse |
| 2015/0366751 A1 | 12/2015 | Stemple |
| 2016/0000647 A1 | 1/2016 | Eberhardt |
| 2016/0022533 A1 | 1/2016 | Makower et al. |
| 2016/0045392 A1 | 2/2016 | Massey et al. |
| 2016/0058509 A1 | 3/2016 | Van De Wouw et al. |
| 2016/0074276 A1 | 3/2016 | Scheuring et al. |
| 2016/0120375 A1 | 5/2016 | Philips |
| 2016/0120737 A1 | 5/2016 | Sedic |
| 2016/0136036 A1 | 5/2016 | Cai |
| 2016/0151236 A1 | 6/2016 | Makower et al. |
| 2016/0175186 A1 | 6/2016 | Shadduck |
| 2016/0213557 A1 | 7/2016 | Lenke |
| 2016/0235621 A1 | 8/2016 | Choe |
| 2016/0296417 A1 | 10/2016 | Topolovac et al. |
| 2017/0027809 A1 | 2/2017 | Lenke |
| 2017/0027810 A1 | 2/2017 | Murison |
| 2017/0065483 A1 | 3/2017 | Lenke |
| 2017/0095399 A1 | 4/2017 | Lee |
| 2017/0135895 A1 | 5/2017 | Jafri |
| 2017/0156971 A1 | 6/2017 | Topolovac et al. |
| 2017/0196801 A1 | 7/2017 | Ghazvini et al. |
| 2017/0202731 A1 | 7/2017 | Goldfarb et al. |
| 2017/0216135 A1 | 8/2017 | Lenke |
| 2017/0281457 A1 | 10/2017 | Witt |
| 2017/0319430 A1 | 11/2017 | Shadduck |
| 2018/0031089 A1 | 2/2018 | Wong et al. |
| 2018/0031090 A1 | 2/2018 | Wong et al. |
| 2018/0071167 A1 | 3/2018 | Lee |
| 2018/0092799 A1 | 4/2018 | Lenke |
| 2018/0125748 A1 | 5/2018 | Goldenberg et al. |
| 2018/0153764 A1 | 6/2018 | Lenke |
| 2018/0243162 A1 | 8/2018 | Lenke |
| 2019/0083354 A1 | 3/2019 | Pahl |
| 2020/0046599 A1 | 2/2020 | Sedic |
| 2020/0188221 A1 | 6/2020 | Lenke |
| 2020/0237609 A1 | 7/2020 | Kirsten et al. |
| 2020/0281808 A1 | 9/2020 | Kirsten et al. |

FOREIGN PATENT DOCUMENTS

| | | | |
|---|---|---|---|
| AU | 2014323661 | 3/2018 | |
| AU | 2015386680 | 3/2018 | |
| CA | 2923526 | 3/2015 | |
| CA | 2978495 | 9/2016 | |
| CA | 2943097 | 10/2017 | |
| CH | 329193 | 4/1958 | |
| CN | 2153351 | 1/1994 | |
| CN | 2153351 Y * | 1/1994 | ............ A61H 9/00 |
| CN | 2198900 Y | 5/1995 | |
| CN | 2765609 | 3/2006 | |
| CN | 201119979 | 9/2008 | |
| CN | 101848688 A | 9/2010 | |
| CN | 102151219 A | 8/2011 | |
| CN | 202154785 U | 3/2012 | |
| CN | 102600034 A | 7/2012 | |
| CN | 102743275 A | 10/2012 | |
| CN | 102743276 A | 10/2012 | |
| CN | 103517697 A | 1/2014 | |
| CN | 103961246 A | 8/2014 | |
| CN | 104248500 A | 12/2014 | |
| CN | 104284648 | 1/2015 | |
| CN | 204931954 U | 1/2016 | |
| CN | 105616124 | 6/2016 | |
| CN | 205494128 U | 8/2016 | |

(56) References Cited

FOREIGN PATENT DOCUMENTS

| | | |
|---|---|---|
| CN | 107137218 | 9/2017 |
| CN | 108599516 | 9/2018 |
| DE | 582196 U | 8/1933 |
| DE | 1463673 U | 2/1939 |
| DE | 856788 | 11/1952 |
| DE | 1703184 U | 7/1955 |
| DE | 7237890 | 3/1973 |
| DE | 3222467 A1 | 12/1983 |
| DE | 3515691 A1 | 2/1986 |
| DE | 3515691 C2 | 8/1990 |
| DE | 9309994.0 | 11/1993 |
| DE | 4243876 A1 | 6/1994 |
| DE | 4304091 | 8/1994 |
| DE | 69108892 | 12/1995 |
| DE | 29809041 | 11/1998 |
| DE | 10011289 A1 | 9/2001 |
| DE | 20112384 U1 | 10/2001 |
| DE | 20106065 | 11/2001 |
| DE | 19853353 C2 | 5/2002 |
| DE | 10100795 | 8/2002 |
| DE | 10218124 | 11/2003 |
| DE | 202005004843 U1 | 7/2005 |
| DE | 102004017702 A1 | 10/2005 |
| DE | 102006016401 | 8/2007 |
| DE | 102005042092 | 10/2007 |
| DE | 202007019339 | 1/2012 |
| DE | 202012005414 U1 | 8/2012 |
| DE | 102012015471 | 2/2014 |
| DE | 102013100943 | 7/2014 |
| DE | 212013000027 U1 | 9/2014 |
| DE | 102013110501 | 3/2015 |
| DE | 202015005041 | 10/2015 |
| DE | 202015105689 | 11/2015 |
| DE | 102016105019 | 7/2017 |
| EP | 0251430 | 1/1988 |
| EP | 0365230 A2 | 4/1990 |
| EP | 0472965 | 3/1992 |
| EP | 0503027 | 4/1995 |
| EP | 1477149 | 11/2004 |
| EP | 1554947 B1 | 7/2005 |
| EP | 1143909 | 6/2008 |
| EP | 2042147 A1 | 4/2009 |
| EP | 2645979 | 10/2013 |
| EP | 2712601 A1 | 4/2014 |
| EP | 2777680 A1 | 9/2014 |
| EP | 2895135 | 7/2015 |
| EP | 3031438 | 6/2016 |
| EP | 3260106 | 12/2017 |
| EP | 3305266 | 4/2018 |
| EP | 3357383 | 8/2018 |
| EP | 2976057 | 12/2018 |
| GB | 18973 * | 8/1910 |
| GB | 1049972 * | 11/1966 |
| GB | 1060507 | 3/1967 |
| JP | 53135768 | 11/1978 |
| JP | 53149442 | 12/1978 |
| JP | 54115952 B2 | 9/1979 |
| JP | 57099986 A | 6/1982 |
| JP | H05037234 U | 5/1993 |
| JP | 2555943 | 11/1997 |
| JP | 2000197518 A | 7/2000 |
| JP | 2005288079 A | 10/2005 |
| JP | 2008-125577 | 6/2008 |
| KR | 20-2000-0002800 | 2/2000 |
| KR | 10-2001- 0093088 | 10/2001 |
| KR | 10-2001-0093088 | 10/2001 |
| RU | 2014059 | 6/1994 |
| RU | 2005134513 | 4/2006 |
| TW | 201507719 A | 3/2015 |
| TW | 201542190 A | 11/2015 |
| TW | 201603797 A | 2/2016 |
| WO | 9205758 A1 | 4/1992 |
| WO | 2000/28939 A2 | 5/2000 |
| WO | 2004004610 A1 | 1/2004 |
| WO | 2004058134 | 7/2004 |
| WO | 2005061042 | 7/2005 |
| WO | 2005099366 | 10/2005 |
| WO | 2005110331 | 11/2005 |
| WO | 2006058291 A2 | 6/2006 |
| WO | 2006063461 A1 | 6/2006 |
| WO | 2007119034 | 10/2007 |
| WO | 2007121107 | 10/2007 |
| WO | 2008002625 | 1/2008 |
| WO | 2008028076 A2 | 3/2008 |
| WO | 2008052151 | 5/2008 |
| WO | 2008107902 | 9/2008 |
| WO | 2009012172 | 1/2009 |
| WO | 2009087627 | 7/2009 |
| WO | 2010149168 | 12/2010 |
| WO | 2011146948 | 11/2011 |
| WO | 2012152297 | 11/2012 |
| WO | 2013003954 | 1/2013 |
| WO | 2013067367 | 5/2013 |
| WO | 2013134388 | 9/2013 |
| WO | 2013138658 | 9/2013 |
| WO | 2013178223 A2 | 12/2013 |
| WO | 2014047718 A1 | 4/2014 |
| WO | 2014048884 | 4/2014 |
| WO | 2014081600 | 5/2014 |
| WO | 2014085736 A1 | 6/2014 |
| WO | 2014127531 | 8/2014 |
| WO | 2014131110 A1 | 9/2014 |
| WO | 2015039787 | 3/2015 |
| WO | 2015060717 | 4/2015 |
| WO | 2015070242 | 5/2015 |
| WO | 2015096179 | 7/2015 |
| WO | 2015101790 | 7/2015 |
| WO | 2016146206 | 9/2016 |
| WO | 2016172653 | 10/2016 |
| WO | 2017141037 | 8/2017 |
| WO | 2017158107 | 9/2017 |
| WO | 2018065540 | 4/2018 |
| WO | 2019158240 | 8/2019 |
| WO | 2019192660 | 10/2019 |
| WO | 2019192661 | 10/2019 |

OTHER PUBLICATIONS

"Valve.", Merriam-Webster.com, Merriam-Webster, 2016, Dec. 26, 2016, 1 pg.

"Pump.", Merriam-Webster.com, Merriam-Webster, 2016, Dec. 26, 2016, 1 pg.

Jessica L. Sparks et al., "Use of Silicone Materials to Simulate Tissue Biomechanics as Related to Deep Tissue Injury", Advances in Skin & Wound Care; vol. 28 No. 2, Feb. 2015; pp. 59-68.

John Z. Wu et al., "Simultaneous determination of the nonlinear-elastic properties of skin and subcutaneous tissue in unconfined compression tests," Skin Research and Technology, Feb. 2007; 13: pp. 34-42.

Linder-Ganz E et al., "Assessment of mechanical conditions in sub-dermal tissues during sitting: a combined experimental-MRI and finite element approach," Journal of Biomechanics 40 (2007) pp. 1443-1454.

H. Zahouani et al., "Characterization of the mechanical properties of a dermal equivalent compared with human skin in vivo by indentation and static friction tests," Skin Research and Technology, Feb. 2009; 15: pp. 68-76.

Beate Lakotta, Schmerz und Glückseligkeit, Der Spiegel, pp. 136-138, Jun. 2006.

Maria M. Kettenring, "Erotische Partnermassage", Grafe und Unser Publishers, 2004, 4 pgs.

"Sex hilft gegen Erkaltung," Focus Online, Dec. 5, 2004; 2 pgs.

"Gesundheitsminister. Mehr Sex gegen Bluthochdruck," http://www.heilpraxisnet.delnaturheilpraxis/sex-gegen-bluthochdruck-665.php, Apr. 27, 2010, 2 pgs.

International Search Report and Written Opinion dated Sep. 25, 2014, in connection with International Patent Application No. PCT/EP2014/065734, 14 pgs.

International Search Report and Written Opinion dated Jul. 22, 2016, in connection with International Patent Application No. PCT/EP2015/067017, 29 pgs.

(56) References Cited

OTHER PUBLICATIONS

Partial International Search report dated Mar. 6, 2018 from PCT Patent Appln. No. PCT/EP2017/075400, 21 pgs.
Partial International Search Report dated Mar. 1, 2018 from PCT Patent Appln. No. PCT/EP2017/075399, 16 pgs.
Search report dated Mar. 8, 2018 from European Patent Appln. No. EP14741640.8, 6 pgs.
Search Report dated Mar. 5, 2018 from European Patent Appln. No. EP17202394.7, 4 pgs.
Examination Report dated Dec. 20, 2017 from Australian Patent Application No. 2017228536; 5 pages.
Document submitted in opposition of German Patent No. 102013110501.7 on Jan. 24, 2018; 34 pages.
Office Action dated Mar. 1, 2018 from New Zealand Patent Appln. No. 735370, 5 pgs.
Office Action dated Jan. 25, 2018 from Canadian Patent Appln. No. 2,978,739, 5 pgs.
Non-Final Office Action dated Nov. 13, 2018, in connection with U.S. Appl. No. 15/354,599; 34 pgs.
New Zealand Further Examination Report dated Aug. 23, 2018, in connection with New Zealand Patent Application No. 735229; 4 pgs.
Singapore Written Opinion dated Jul. 24, 2018, in connection with Singapore Patent Application No. 11201707395T; 8 pgs.
Australian Statement of Grounds and Particulars of Opposition dated Sep. 21, 2018, in connection with an opposition against Australian Patent Application No. 2015386680; 11 pgs.
Taiwan Office Action dated Aug. 9, 2018, in connection with Taiwan Patent Application No. 106132654, 3 pgs.
Non-Final Office Action dated Aug. 31, 2018, in connection with U.S. Appl. No. 15/719,085; 17 pgs.
Office Action dated Jun. 12, 2018, in connection with Canadian Patent Application No. 2,978,739; 4 pgs.
Search Report dated Apr. 27, 2018, in connection with European Patent Application No. 17190856, 4 pgs., An English translation of this document, or portion thereof, is not within the possession, custody, or control of, or is not readily available to any individual designated in § 1.56(c).
International Search Report dated Apr. 17, 2018, in connection with PCT Patent Application No. PCT/EP2017/075399; 9 pgs.
International Search Report dated May 7, 2018, in connection with PCT Patent Application No. PCT/EP2017/075400; 11 pgs.
Search Report and Written Opinion dated May 18, 2018, in connection with Singapore Patent Application No. 10201707736X; 8 pgs.
Final Office Action dated Jun. 28, 2018, in connection with U.S. Appl. No. 15/354,599; 39 pgs.
Non-Final Office Action dated Jun. 29, 2018, in connection with U.S. Appl. No. 15/965,208; 31 pgs.
Final Office Action dated May 7, 2018, in connection with U.S. Appl. No. 15/719,085; 14 pgs.
United States Patent and Trademark Office, "Non-Final Office action," issued in connection with U.S. Appl. No. 15/302,981, dated Jun. 2, 2017, 38 pages.
United States Patent and Trademark Office, "Final Office action," issued in connection with U.S. Appl. No. 15/487,123, dated Sep. 29, 2017, 9 pages.
United States Patent and Trademark Office, "Notice of Allowance and Fee(s) Due," issued in connection with U.S. Appl. No. 15/302,981, dated Oct. 12, 2017, 12 pages.
United States Patent and Trademark Office, "Notice of Allowance and Fee(s) Due," issued in connection with U.S. Appl. No. 15/487,123, dated Dec. 11, 2017, 18 pages.
United States Patent and Trademark Office, "Non-Final Office action," issued in connection with U.S. Appl. No. 15/888,568, dated Jan. 10, 2019, 18 pages.
IP Australia, "Examination Report No. 2 for Standard Patent Application," issued in connection with Australian Application No. 2018200852, dated Dec. 19, 2018, 4 pages.

International Searching Authority, "International Search Report and Written Opinion," issued in connection with International Application No. PCT/EP2018/082681, dated Jan. 30, 2019, 25 pages (includes English machine translation of pp. 13 to 17).
International Searching Authority, "Written Opinion," issued in connection with International Application No. PCT/EP2017/075400, dated May 18, 2018, 10 pages.
Zimmerman et al., "The Gentle Touch Receptors of Mammalian Skin," Special Section: Skin, Science, Nov. 21, 2014, vol. 346, Issue 6212, 6 pages.
Verkauf, MD. et al., "Clitoral Size in Normal Women," Obstetrics & Gynecology, vol. 80, No. 1, Jul. 1992, 4 pages.
International Searching Authority, "International Search Report," issued in connection with International Application No. PCT/EP2017/075400, dated May 18, 2018, 6 pages.
Final Office Action dated Dec. 10, 2018, in connection with U.S. Appl. No. 15/965,208, 19 pgs.
IP Australia, "Notice of Acceptance for Patent Application," issued in connection with Australian Application No. 2017228536, dated Jun. 21, 2018, 3 pages.
China National Intellectual Property Administration, "First Office Action," issued in connection with Chinese Application No. 201710927530.4, dated Mar. 25, 2019, 5 pages. (English translation included).
IP Australia, "Examination Report No. 1 for Standard Patent Application," issued in connection with Australian Application No. 2018203659, dated Nov. 15, 2017, 3 pages.
IP Austalia, "Examination Report No. 1 for Standard Patent Application," issued in connection with Australian Application No. 2015203659, dated Dec. 14, 2018, 2 pages.
Canadian Patent Office, "Office Action," issued in connection with Canadian Application No. 2,978,495, dated Nov. 20, 2017, 4 pages.
Canadian Patent Office, "Office Action," issued in connection with Canadian Application No. 2,978,495, dated Apr. 11, 2018, 4 pages.
China National Intellectual Property Administration, "First Office Action," issued in connection with Chinese Application No. 201580077725.3, dated Feb. 3, 2019, 2019, 5 pages. (English translation included.).
New Zealand Intellectual Property Office, "First Examination Report," issued in connection with NZ Application No. 735229, dated May 2, 2018, 4 pages.
New Zealand Intellectual Property Office, "Further Examination Report," issued in connection with NZ Application No. 735229, dated Dec. 17, 2018, 3 pages.
IP Australia, "Examination Report No. 1 for Standard Patent Application," issued in connection with Australian Patent Application No. 2014323661, dated Mar. 2, 2017, 4 pages.
IP Australia, "Examination Report No. 1 for Standard Patent Application," issued in connection with Australian Application No. 2018200852, dated Feb. 15, 2018, 5 pages.
Canadian Patent Office, "Office Action," issued in connection with Candian Patent Application No. 2,923,526, dated May 24, 2018, 5 pages.
Canadian Patent Office, "Office Action," issued in connection with Candian Patent Application No. 2,923,526, dated Oct. 16, 2018, 3 pages.
China National Intellectual Property Administration, "First Office Action," issued in connection with Chinese Patent Application No. 201480052194.8, dated Sep. 28, 2016, 7 pages. (English Translation included.).
China National Intellectual Property Administration, "Second Office Action," issued in connection with Chinese Patent Application No. 201480052194.8, dated Mar. 3, 2017, 10 pages. (English Translation included.).
China National Intellectual Property Administration, "Third Office Action," issued in connection with Chinese Patent Application No. 201480052194.8, dated Jul. 4, 2017, 11 pages. (English Translation included.).
China National Intellectual Property Administration, "First Office Action," issued in connection with Chinese Patent Application No. 201710709587.7, dated Feb. 28, 2019, 5 pages. (English Translation included.).

(56) References Cited

OTHER PUBLICATIONS

United States Patent and Trademark Office, "Notice of Allowance and Fee(s) Due," issued in connection with Design U.S. Appl. No. 29/590,450, dated May 8, 2018, 24 pages.
United States Patent and Trademark Office, "Notice of Allowance and Fee(s) Due," issued in connection with Design U.S. Appl. No. 35/502,986, dated May 1, 2018, 19 pages.
German Patent and Trademark Office, "Examination Report," issued in connection with German Application No. 10 2016 118 911.1, dated Nov. 4, 2016, 10 pages. (English translation included.).
European Patent Office, "European Search Report," issued in connection with European Application No. 17190856.9, dated May 14, 2018, 30 pages. (English translation included.).
European Patent Office, "European Search Report," issued in connection with European Application No. 17190856.9, dated Feb. 2, 2018, 34 pages. (English translation included.).
The International Bureau of WIPO, "International Report on Patentability," issued in connection with International Application No. PCT/EP2017/075399, dated Apr. 9, 2019, 15 pages.
International Searching Authority, "Written Opinion," issued in connection with International Application No. PCT/EP2017/075399, dated Apr. 25, 2018, 14 pages.
International Searching Authority, "International Search Report," issued in connection with International Application No. PCT/EP2017/075399, dated Apr. 25, 2018, 9 pages.
German Patent and Trademark Office, "Examination Report," issued in connection with German Application No. 10 2015 103 694.0, dated Mar. 24, 2015, 8 pages. (English translation included.).
German Patent and Trademark Office, "Examination Report," issued in connection with German Application No. 10 2015 103 694.0, dated Dec. 7, 2016, 12 pages. (English translation included.).
European Patent Office, "European Search Report," issued in connection with European Patent Application No. 18175171.0, dated Sep. 14, 2018, 28 pages. (English translation included.).
European Patent Office, "Notification under Article 94 (3) EPO," issued in connection with European Application No. 18175171.0, dated Jun. 14, 2019, 8 pages. (English translation included.).
The International Bureau of WIPO, "International Report on Patentability," issued in connection with International Application No. PCT/EP2015/067017, dated Sep. 19, 2017, 13 pages (corresponds to English translation of Written Opinion for International Application No. PCT/EP2015/067017 dated Jul. 22, 2016, cited herein as NPL50).
German Patent and Trademark Office, "Office Action," issued in connection with German Patent Application No. 10 2013 110 501.7, dated Oct. 1, 2013, 8 pages. (English translation included.).
German Patent and Trademark Office, "Office Action," issued in connection with German Patent Application No. 10 2013 110 501.7, dated Apr. 15, 2014, 8 pages. (English translation included.).
German Patent and Trademark Office, "Office Action," issued in connection with German Patent Application No. 10 2013 110 501.7, dated Feb. 6, 2015, 10 pages. (English translation included.).
German Patent and Trademark Office, "Office Action," issued in connection with German Patent Application No. 10 2013 110 501.7, dated Nov. 18, 2015, 8 pages. (English translation included.).
German Patent and Trademark Office, "Office Action," issued in connection with German Patent Application No. 10 2013 022 511.6, dated May 9, 2019, 16 pages. (English translation included.).
German Patent and Trademark Office, "Office Action," issued in connection with German Patent Application No. 10 2013 022 512.4, dated May 3, 2019, 14 pages. (English translation included.).
German Patent and Trademark Office, "Office Action," issued in connection with German Patent Application No. 10 2013 022 520.5, dated May 9, 2019, 14 pages. (English translation included.).
European Patent Office, "Notification under Article 94 (3) EPC," issued in connection with European Application No. 14741640.8, dated Aug. 23, 2016, 8 pages.(English translation included.).
European Patent Office, "Notification under Article 94 (3) EPC," issued in connection with European Application No. 14741640.8, dated Mar. 8, 2018, 12 pages. (English translation included.).
European Patent Office, "Notification under Article 94 (3) EPC," issued in connection with European Application No. 17202385.5, dated May 18, 2018, 12 pages. (English translation included.).
European Patent Office, "Result of the Consultation" issued in connection with European Application No. 17202385.5, dated Jul. 18, 2018, 6 pages. (English translation included.).
European Patent Office, "Search Report," issued in connection with European Application No. 17202385.5, dated Mar. 8, 2018, 6 pages. (English translation included.).
European Patent Office, "Notification under Article 94 (3) EPC," issued in connection with European Application No. 17202394.7, dated May 18, 2018, 12 pages. (English translation included.).
European Patent Office, "Result of the Consultation," issued in connection with European Application No. 17202394.7, dated Jul. 18, 2018, 6 pages. (English translation included.).
European Patent Office, "Search Report," issued in connection with European Application No. 17202394.7, dated Mar. 8, 2018, 8 pages. (English translation included.).
European Patent Office, "Notification under Article 94 (3) EPC," issued in connection with European Application No. 18206800.7, dated Apr. 8, 2019, 10 pages. (English translation included.).
European Patent Office, "Search Report," issued in connection with European Application No. 18206800.7, dated Feb. 27, 2019, 8 pages. (English translation included.).
International Searching Authority, "International Search Report and Written Opinion of the International Searching Authority," issued in connection with International Application No. PCT/EP2014/065734, dated Sep. 25, 2014, 19 pages. (English Translation included.).
The International Bureau of WIPO, "International Preliminary Report on Patentability," issued in connection with International Application No. PCT/EP2014/065734, dated Mar. 26, 2016, 7 pages.
The International Bureau of WIPO, "International Search Report and Written Opinion," issued in connection with International Application No. PCT/EP2015/067017, dated Jul. 22, 2016, 34 pages (English translation included).
European Patent Office, "Examination Report," issued in connection with application No. 15748202.7 dated Jun. 24, 2019, 8 pages. (English translation included.).
"Petition for Inter Partes Review of U.S. Pat. No. 9,937,097," filed with the United States Patent and Trademark Office on Jul. 3, 2019, 95 pages.
"Petition for Inter Partes Review of U.S. Pat. No. 9,937,097," Exhibit 1001, filed with the United States Patent and Trademark Office on Jul. 3, 2019, 18 pages.
"Petition for Inter Partes Review of U.S. Pat. No. 9,937,097," Exhibit 1002, filed with the United States Patent and Trademark Office on Jul. 3, 2019, 215 pages.
"Petition for Inter Partes Review of U.S. Pat. No. 9,937,097," Exhibit 1003, filed with the United States Patent and Trademark Office on Jul. 3, 2019, 360 pages.
"Petition for Inter Partes Review of U.S. Pat. No. 9,937,097," Exhibit 1004, filed with the United States Patent and Trademark Office on Jul. 3, 2019, 9 pages.
"Petition for Inter Partes Review of U.S. Pat. No. 9,937,097," Exhibit 1005, filed with the United States Patent and Trademark Office on Jul. 3, 2019, 34 pages.
"Petition for Inter Partes Review of U.S. Pat. No. 9,937,097," Exhibit 1006, filed with the United States Patent and Trademark Office on Jul. 3, 2019, 13 pages.
"Petition for Inter Partes Review of U.S. Pat. No. 9,937,097," Exhibit 1007, filed with the United States Patent and Trademark Office on Jul. 3, 2019, 11 pages.
"Petition for Inter Partes Review of U.S. Pat. No. 9,937,097," Exhibit 1008, filed with the United States Patent and Trademark Office on Jul. 3, 2019, 46 pages.
"Petition for Inter Partes Review of U.S. Pat. No. 9,937,097," Exhibit 1009, filed with the United States Patent and Trademark Office on Jul. 3, 2019, 1837 pages. (Uploaded in 4 parts).
"Petition for Inter Partes Review of U.S. Pat. No. 9,937,097," Exhibit 1010, filed with the United States Patent and Trademark Office on Jul. 3, 2019, 17 pages.

(56) References Cited

OTHER PUBLICATIONS

"Petition for Inter Partes Review of U.S. Pat. No. 9,937,097," Exhibit 1011, filed with the United States Patent and Trademark Office on Jul. 3, 2019, 6 pages.
"Petition for Inter Partes Review of U.S. Pat. No. 9,937,097," Exhibit 1012, filed with the United States Patent and Trademark Office on Jul. 3, 2019, 47 pages.
"Petition for Inter Partes Review of U.S. Pat. No. 9,937,097," Exhibit 1013, filed with the United States Patent and Trademark Office on Jul. 3, 2019, 61 pages.
"Petition for Inter Partes Review of U.S. Pat. No. 9,937,097," Exhibit 1014, filed with the United States Patent and Trademark Office on Jul. 3, 2019, 5 pages.
"Petition for Inter Partes Review of U.S. Pat. No. 9,937,097," Exhibit 1015, filed with the United States Patent and Trademark Office on Jul. 3, 2019, 1049 pages.
"Sex hilflt gegen Erkaltung," Focus Online, Dec. 5, 2004, 2 pages (English translation included).
Beate Lakotta, Schmerz and Gluckseligkeit, Der Spiegel, pp. 136-138, Jun. 2006, 7 pages (English translation included).
"Petition for Inter Partes Review of U.S. Pat. No. 9,763,851," filed with the United States Patent and Trademark Office on Jul. 31, 2019, 87 pages.
"Petition for Inter Partes Review of U.S. Pat. No. 9,763,851," Exhibit 1001, filed with the United States Patent and Trademark Office on Jul. 3, 2019, 17 pages.
"Petition for Inter Partes Review of U.S. Pat. No. 9,763,851," Exhibit 1002, filed with the United States Patent and Trademark Office on Jul. 31, 2019, 109 pages.
"Petition for Inter Partes Review of U.S. Pat. No. 9,763,851," Exhibit 1003 Part 1, filed with the United States Patent and Trademark Office on Jul. 31, 2019, 649 pages.
"Petition for Inter Partes Review of U.S. Pat. No. 9,763,851," Exhibit 1003 Part 2, filed with the United States Patent and Trademark Office on Jul. 31, 2019, 663 pages.
"Petition for Inter Partes Review of U.S. Pat. No. 9,763,851," Exhibit 1004, filed with the United States Patent and Trademark Office on Jul. 31, 2019, 11 pages.
"Petition for Inter Partes Review of U.S. Pat. No. 9,763,851," Exhibit 1005, filed with the United States Patent and Trademark Office on Jul. 31, 2019, 34 pages.
"Petition for Inter Partes Review of U.S. Pat. No. 9,763,851," Exhibit 1006, filed with the United States Patent and Trademark Office on Jul. 31, 2019, 46 pages.
"Petition for Inter Partes Review of U.S. Pat. No. 9,763,851," Exhibit 1007, filed with the United States Patent and Trademark Office on Jul. 31, 2019, 36 pages.
"Petition for Inter Partes Review of U.S. Pat. No. 9,763,851," Exhibit 1008, filed with the United States Patent and Trademark Office on Jul. 31, 2019, 46 pages.
"Petition for Inter Partes Review of U.S. Pat. No. 9,763,851," Exhibit 1009, filed with the United States Patent and Trademark Office on Jul. 31, 2019, 5 pages.
"Petition for Inter Partes Review of U.S. Pat. No. 9,763,851," Exhibit 1010, filed with the United States Patent and Trademark Office on Jul. 31, 2019, 61 pages.
"Petition for Inter Partes Review of U.S. Pat. No. 9,763,851," Exhibit 1011, filed with the United States Patent and Trademark Office on Jul. 31, 2019, 6 pages.
"Petition for Inter Partes Review of U.S. Pat. No. 9,763,851," Exhibit 1012, filed with the United States Patent and Trademark Office on Jul. 31, 2019, 1049 pages. (Uploaded in 3 parts.).

"Gesundheitsminister. Mehr Sex gegen Bluthochdruck," http://www.heilpraxisnet.delnaturheilpraxis/sex-gegen-bluthochdruck-665.php, Apr. 2010, 2 pages (English translation included).
IP Australia, "General Correspondence," issued in connection with Australian Patent Application No. 2015386680 dated Jul. 24, 2019, 2 pages.
German Patent and Trademark Office, "English Translation of Invitation to Speak," issued in connection with opposition of German Patent No. 102013110501.7 dated Nov. 17, 2016, 20 pages.
"Patent Owner's Preliminary Response to 37 C.F.R. § 42.107," Exhibit 2024, filed with the United States Patent and Trademark Office in connection with Case IPR2019-01302 on Oct. 18, 2019, 7 pages.
"Patent Owner's Preliminary Response to 37 C.F.R. § 42.107," Exhibit 2025, filed with the United States Patent and Trademark Office in connection with Case IPR2019-01302 on Oct. 18, 2019, 1 page.
United States Patent and Trademark Office, "Notice of Filing Date Accorded to Petition and Time for Filing Patent Owner Preliminary Response," issued in connection with Case IPR2020-00007 dated Oct. 8, 2019, 5 pages.
The International Bureau of WIPO, "English Translation of International Report on Patentability," issued in connection with application No. PCT/EP2017/075400, dated Apr. 9, 2019, 12 pages.
"Patent Owner's Preliminary Response Pursuant to 37 C.F.R. § 42.107," Exhibit 2026, filed with the United States Patent Office in connection with Case IPR2020-00007 on Jan. 8, 2020, 13 pages.
"Decision Denying Insitution of Inter Partes Review," issued by the United States Patent and Trademark Office in connection with Case IPR2019-01302 on Jan. 13, 2020, 21 pages.
United States Patent and Trademark Office, "Notice of Allowance and Fee(s) Due," issued in connection with U.S. Appl. No. 15/719,085, on Mar. 20, 2019, 12 pages.
United States Patent and Trademark Office, "Notice of Allowance," issued in connection with U.S. Appl. No. 15/719,085, dated Jul. 3, 2019, 12 pages.
United States Patent and Trademark Office, "Final Office Action," issued in connection with U.S. Appl. No. 15/888,568, dated Apr. 16, 2020, 7 pages.
United States Patent and Trademark Office, "Notice of Allowance," issued in connection with U.S. Appl. No. 15/719,085, dated Apr. 21, 2020, 12 pages.
"Petitioner's Amended Mandatory Notices Pursuant to 37 C.F.R. 42 8," filed with the United States Patent and Trademark Office in connection with Case IPR2020-00007 on Feb. 25, 2020, 5 pages.
Canadian Patent Office, "Notice of Allowance," issued in connection with Canadian Patent Application No. 2978739, dated Jan. 30, 2020, 1 page.
United States Patent and Trademark Office, "Notice of Allowance," issued in connection with U.S. Appl. No. 15/965,208, dated Apr. 8, 2020, 9 pages.
Canadian Patent Office, "Office Action," issued in connecction with Canadian Patent Application No. 3051672, dated Mar. 4, 2020, 4 pages.
United States Patent and Trademark Office, "Notice of Allowance," issued in connection with U.S. Appl. No. 15/354,599, dated Mar. 25, 2020, 21 pages.
Korean Patent Office, "Notice of Allowance," issued in connection with Korean Patent Application No. 10-2017-7028845, dated Mar. 30, 2020, 6 pages (inlcudes English translation).
"Order," issued by the United States Patent and Trademark Office in connection with Case IPR 2019-01302 on Apr. 6, 2020, 2 pages.
"Order," issued by the United States Patent and Trademark Office in connection with Case IPR 2019-01444 on Apr. 6, 2020, 2 pages.
"Decision Denying Institution of Inter Partes Review," filed with the United States Patent and Trademark Office in connection with Case IPR 2020-00007 on Apr. 6, 2020, 31 pages.
United States Patent and Trademark Office, "Supplemental Notice of Allowability," issued in connection with U.S. Appl. No. 15/719,085, dated Apr. 3, 2020, 7 pages.

(56) References Cited

OTHER PUBLICATIONS

*EIS, Inc.* v. *Wow Tech International GmbH*, "Defendant's Revised Motion to Dismiss EIS, Inc.'s Complaint Pursuant to Federal Rule of Civil Procedure 12(b)(6)," filed with the United States District Court for the District of Delaware in connection with Case No. 1:19-cv-01277-LPS on Feb. 4, 2020, 3 pages.
*EIS, Inc.* v. *Wow Tech International GmbH*, "Defendant's Opening Brief in Support of the Revised Motion to Dismiss Pursuant to Rule 12(b)(6)," filed with the United States District Court for the District of Delaware in connection with Case No. 1:19-cv-01277-LPS on Feb. 4, 2020, 30 pages.
*EIS, Inc.* v. *Wow Tech International GmbH*, "Plaintiff EIS's Answering Brief in Opposition to Defendant's Revised Motion to Dismiss Pursuant to Rule 12(b)(6)," filed with the United States District Court for the District of Delaware in connection with Case No. 1:19-cv-01277-LPS on Feb. 4, 2020, 33 pages.
European Patent Office, "Extended European Search Report," issued in connection with European Patent Application No. EP 19161328.0, dated Jul. 18, 2019, 9 pages (includes English translation of written opinion).
"Petitioner's Request for Rehearing Under 37 C.F.R. 42 71," filed with the United States Patent and Trademark Office in connection with Case IPR2019-01302 on Feb. 7, 2020, 20 pages.
"Petitioner's Amended Mandatory Notices Pursuant to 37 C F R 42 8," filed with the United States Patent and Trademark Office in connection with Case IPR2019-01302 on Feb. 25, 2020, 5 pages.
"Petitioner's Amended Mandatory Notices Pursuant to 37 C.F.R. 42.8," filed with the United States Patent and Trademark Office in connection with Case IPR2019-01444 on Feb. 25, 2020, 5 pages.
"Petitioner's Request for Rehearing Under 37 C.F.R. 42.71," filed with the United States Patent and Trademark Office in connection with Case IPR2019-01444 on Mar. 6, 2020, 19 pages.
United States Patent and Trademark Office, "Notice of Allowance," issued in connection with U.S. Appl. No. 15/719,085, dated Mar. 13, 2013, 12 pages.
*EIS, Inc.* v. *Wow Tech International GmbH*, "Defendant's Reply in Support of Their Revised Motion to Dismiss Pursuant to Rule 12(b)(6)," filed with the United States District Court for the District of Delaware in connection with Case No. 1:19-cv-01277-LPS on Mar. 10, 2020, 16 pages.
United Stated Patent and Trademark Office, "Notice of Allowance," issued in connection with U.S. Appl. No. 15/719,085, dated Feb. 3, 2020, 12 pages.
China National Intellectual Property Administration, "Second Office Action," issued in connection with Chinese Patent Application No. 201710927530.4, dated Apr. 16, 2020, 6 pages (English Translation Included).
United States Patent and Trademark Office, "Notice of Allowance," issued in connection with U.S. Appl. No. 15/719,085, dated May 6, 2020, 12 pages.
United States Patent and Trademark Office, "Notice of Allowance," issued in connection with U.S. Appl. No. 15/354,599, dated May 6, 2020, 21 pages.
"Petitioner's Request for Rehearing Under 37 C.F.R. 42.71," filed with the United States Patent and Trademark Office in connection with Case IPR2020-00007 dated May 6, 2020, 20 pages.
"Petitioner's Amended Mandatory Notices Pursuant to 37 C.F.R. 42.8," filed with the United States Patent and Trademark Office in connection with Case IPR2019-01302 on Apr. 17, 2020, 5 pages.
"Petitioner's Amended Mandatory Notices Pursuant to 37 C.F.R. 42.8," filed with the United States Patent and Trademark Office in connection with Case IPR2019-01444 on Apr. 17, 2020, 5 pages.
United States Patent and Trademark Office, "Notice of Allowance," issued in connection with U.S. Appl. No. 15/965,208, dated May 15, 2020, 9 pages.
United States Patent and Trademark Office, "Supplemental Notice of Allowability," issued in connection with U.S. Appl. No. 15/719,085, dated May 12, 2020, 6 pages.
United States Patent and Trademark Office, "Supplemental Notice of Allowability," issued in connection with U.S. Appl. No. 15/719,085, dated May 27, 2020, 6 pages.
United States Patent and Trademark Office, "Corrected Notice of Allowability," issued in connection with U.S. Appl. No. 15/965,208, dated Jun. 12, 2020, 11 pages.
United States Patent and Trademark Office, "Corrected Notice of Allowability," issued in connection with U.S. Appl. No. 15/354,599, dated May 27, 2020, 19 pages.
"Decision Granting Petitioner's Request on Rehearing of Decision Denying Institution, Granting Institution of Inter Partes Review," issued by the United States Patent and Trademark Office in connection with Case IPR 2019-01302 on Jun. 17, 2020, 9 pages.
*EIS, Inc.* v. *Wow Tech International GmbH*, "Notice of Supplemental Authority in Support of Plaintiff EIS Inc.'s Opposition to Defendants' Motion to Dismiss," filed with the United States District Court for the District of Delaware in connection with Case No. 1:19-cv-01227-LPS on Jun. 19, 2020, 13 pages.
*EIS, Inc.* v. *Wow Tech International GmbH*, "Defendant's Response to Plaintiff Notice of Supplemental Authority," filed with the United States District Court for the District of Delaware in connection with Case No. 1:19-cv-01227-LPS on Jun. 23, 2020, 8 pages.
*EIS GmbH* v. *USPTO*, "Complaint," filed with the United States District Court for the Eastern District of Virgina in connection with Case No. 1:20-cv-00430-LMB-TCB on Apr. 17, 2020, 636 pages.
*EIS GmbH* v. *USPTO*, "Amended Complaint," filed with the United States District Court for the Eastern District of Virginia in connection with Case No. 1:20-cv-00430-LMB-TCB on Jun. 25, 2020, 577 pages (uploaded in two parts).
United States Patent and Trademark Office, "Corrected Notice of Allowability," issued in connection with U.S. Appl. No. 15/354,599, dated Jul. 13, 2020, 2 pages.
United States Patent and Trademark Office, "Corrected Notice of Allowability," issued in connection with U.S. Appl. No. 15/354,599, dated Aug. 3, 2020, 2 pages.
United States Patent and Trademark Office, "Supplemental Notice of Allowability," issued in connection with U.S. Appl. No. 15/719,085, dated Jul. 27, 2020, 2 pages.
United States Patent and Trademark Office, "Corrected Notice of Allowability," issued in connection with U.S. Appl. No. 15/965,208, dated Jul. 22, 2020, 3 pages.
"Decision Granting Petitioner's Request on Rehearing of Decision Denying Institution, Granting Institution of Inter Partes Review," issued by the United States Patent and Trademark Office in connection with Case IPR 2019-01444 on Aug. 11, 2020, 13 pages.
*EIS, Inc.* v. *Wow Tech International GmbH*, "Notice of Supplemental Authority in Support of Plaintiff EIS Inc.'s Opposition to Defendants' Motion to Dismiss," filed with the United States District Court for the District of Delaware in connection with Case No. 1:19-cv-01227-LPS on Aug. 14, 2020, 17 pages.
"Decision Granting Petitioner's Request on Rehearing of Decision Denying Institution, Granting Institution of Inter Partes Review," issued by the United States Patent and Trademark Office in connection with Case IPR 2020-00007 on Sep. 25, 2020, 22 pages.
International Searching Authority, "International Search Report," issued in connection with International Application No. PCT/DE2019/100309, dated Jul. 15, 2019, 7 pages (includes English translation).
International Searching Authority, "Written Opinion," issued in connection with International Application No. PCT/DE2019/100309, dated Jul. 15, 2019, 13 pages (includes English machine translation).
International Searching Authority, "International Search Report," issued in connection with International Application No. PCT/DE2019/100308, dated Oct. 10, 2019, 10 pages (includes English translation).

(56) References Cited

OTHER PUBLICATIONS

International Searching Authority, "Written Opinion," issued in connection with International Application No. PCT/DE2019/100308, dated Oct. 10, 20, 2019, 22 pages (includes English machine translation).

*EIS, Inc.* v. *Wow Tech International GmbH*, "Defendants' Response to Plaintiff's Second Notice of Supplemental Authority," filed with the United States District Court for the District of Delaware in connection with Case No. 1:19-cv-01227-LPS on Aug. 21, 2020, 191 pages.

"Notification of an Opposition," issued by the European Patent Office in connection with European Patent No. EP3405158 on Oct. 5, 2020, opposition filed by EIS GmbH, 88 pages (includes English translation).

European Patent Office, "Notification under Article 94 (3) EPC," issued in connection with European Application No. 18206800.7, on Nov. 12, 2020, 10 pages. (English translation included.).

Mexican Institute of IP, "First Office Action," issued in connection with Mexican Patent Application No. MX/a/2017/012780, dated Jan. 8, 2021, 5 pages (includes English translation).

"Patent Owner's Sur-Reply Pursuant to 37 C.F.R, 42,23," filed with the United States Patent and Trademark Office in connection with Case IPR2019-01444 on Mar. 9, 2021, 38 pages.

"Patent Owner's Sur-Reply Pursuant to 37 C.F.R. 42.23, Exhibit 2061," filed with the United States Patent and Trademark Office in connection with Case IPR2019-01444 on Mar. 9, 2021, 39 pages.

"Petitioner's Reply to Patent Owner's Response," filed with the United States Patent and Trademark Office in connection with Case IPR2020-00007 on Mar. 12, 2021, 39 pages.

"Petitioner's Reply to Patent Owner's Response, Exhibit 1014" filed with the United States Patent and Trademark Office in connection with Case IPR2020-00007 on Mar. 12, 2021, 177 pages.

"Petitioner's Reply to Patent Owner's Response, Exhibit 1017" filed with the United States Patent and Trademark Office in connection with Case IPR2020-00007 on Mar. 12, 2021, 192 pages.

"Petitioner's Reply to Patent Owner's Response, Exhibit 1018" filed with the United States Patent and Trademark Office in connection with Case IPR2020-00007 on Mar. 12, 2021, 74 pages.

"Petitioner's Reply to Patent Owner's Response, Exhibit 1020" filed with the United States Patent and Trademark Office in connection with Case IPR2020-00007 on Mar. 12, 2021, 42 pages.

"Petitioner's Reply to Patent Owner's Response, Exhibit 1036" filed with the United States Patent and Trademark Office in connection with Case IPR2020-00007 on Mar. 12, 2021, 7 pages.

"Petitioner's Reply to Patent Owner's Response, Exhibit 1037" filed with the United States Patent and Trademark Office in connection with Case IPR2020-00007 on Mar. 12, 2021, 3 pages.

"Petitioner's Reply to Patent Owner's Response, Exhibit 1043" filed with the United States Patent and Trademark Office in connection with Case IPR2020-00007 on Mar. 12, 2021, 8 pages.

IP Australia, "Opposition—Section 104 Amendments," issued in connection with Australian Patent Application No. 2018203659 on Mar. 23, 2021, 6 pages.

"Opponent's Reply," filed with the European Patent Office by Fun Factory GmbH in connection with European Patent No. EP2976057 on Apr. 9, 2021, 233 pages (includes English translation).

"Opponent's Reply, Exhibit A2," filed with the European Patent Office by Fun Factory GmbH in connection with European Patent No. EP2976057 on Apr. 9, 2021, 24 pages (includes English translation).

"Opponent's Reply, Exhibit D34," filed with the European Patent Office by Fun Factory GmbH in connection with European Patent No. EP2976057 on Apr. 9, 2021, 1 page.

"Opponent's Reply, Exhibit D35," filed with the European Patent Office by Fun Factory GmbH in connection with European Patent No. EP2976057 on Apr. 9, 2021, 10 pages (includes English translation).

"Opponent's Reply, Exhibit E4," filed with the European Patent Office by Fun Factory GmbH in connection with European Patent No. EP2976057 on Apr. 9, 2021, 7 pages (includes English translation).

"Opponent's Reply," filed with the European Patent Office by Fun Factory GmbH in connection with European Patent No. EP3308762 on Apr. 9, 2021, 119 pages (includes English translation).

"Opponent's Reply," filed with the European Patent Office by EIS GmbH in connection with European Patent No. EP3308762 on Apr. 9, 2021, 111 pages (includes English translation).

Patent Owner's Sur-Reply Pursuant to 37 C.F.R. 42.23, filed with the United States Patent and Trademark Office in connection with Case IPR2020-00007 on Apr. 23, 2021, 40 pages.

"Opposition to a European Patent," filed with the European Patent Office by Fun Factory GmbH in connection with European Patent No. EP3305266 on Feb. 11, 2021, 138 pages (includes English translation).

"Opposition to a European Patent, Exhibit D15" filed with the European Patent Office by Fun Factory GmbH in connection with European Patent No. EP3305266 on Feb. 11, 2021, 62 pages (includes English translation).

"Opposition to a European Patent," filed with the European Patent Office by EIS GmbH in connection with European Patent No. EP3305266 on Feb. 15, 2021, 199 pages (includes English translation).

"Opposition to a European Patent, Exhibit E36" filed with the European Patent Office by EIS GmbH in connection with European Patent No. EP3305266 on Feb. 15, 2021, 2 pages.

"Statement of Grounds and Particulars of Opposition," filed with IP Australia in connection with Australian Patent Application No. 2018222907 on Feb. 24, 2021, 15 pages.

United States Patent and Trademark Office, "Notice of Allowance," issued in connection with U.S. Appl. No. 15/888,568, dated Feb. 8, 2021, 8 pages.

"Evidence in Support," filed with IP Australia by EIS GmbH in connection with Australian Patent Application No. 2018222907 on May 18, 2021, 53 pages.

United States Patent and Trademark Office, "Notice of Allowance," issued in connection with U.S. Appl. No. 15/354,599, dated Aug. 29, 2019, 19 pages.

IP Australia, "Notice of Opposition," issued in connection with Australian Patent Application No. 2015386680 on Jun. 21, 2018, 4 pages.

"Opponent's Letter," filed with IP Australia in connection with Australian Patent Application No. 2015386680 on Jun. 28, 2019, 10 pages.

IP Australia, "General Correspondence," issued in connection with Australian Patent Application No. 2015386680 on Jul. 24, 2019, 2 pages.

"Opponent's Letter," filed with IP Australia in connection with Australian Patent Application No. 2015386680 on Aug. 7, 2019, 2 pages.

IP Australia, "Reg, 5.23," issued in connection with Australian Patent Application No. 2015386680 on Aug. 16, 2019, 4 pages.

"Statement of Grounds and Particulars of Opposition," filed with IP Australia in connection with Australian Patent Application No. 2018203659 on Aug. 14, 2019, 15 pages.

"Exhibit D1," filed with IP Australia in connection with Australian Patent Application No. 2018203659 on Aug. 14, 2019, 9 pages.

"Exhibit D2," filed with IP Australia in connection with Australian Patent Application No. 2018203659 on Aug. 14, 2019, 9 pages.

"Exhibit D3," filed with IP Australia in connection with Australian Patent Application No. 2018203659 on Aug. 14, 2019, 51 pages.

"Exhibit D4," filed with IP Australia in connection with Australian Patent Application No. 2018203659 on Aug. 14, 2019, 6 pages.

"Exhibit D5," filed with IP Australia in connection with Australian Patent Application No. 2018203659 on Aug. 14, 2019, 5 pages.

"Exhibit D6," filed with IP Australia in connection with Australian Patent Application No. 2018203659 on Aug. 14, 2019, 3 pages.

"Exhibit D7," filed with IP Australia in connection with Australian Patent Application No. 2018203659 on Aug. 14, 2019, 28 pages.

"Exhibit D8," filed with IP Australia in connection with Australian Patent Application No. 2018203659 on Aug. 14, 2019, 8 pages.

(56) References Cited

OTHER PUBLICATIONS

"Exhibit D9," filed with IP Australia in connection with Australian Patent Application No. 2018203659 on Aug. 14, 2019, 11 pages.
"Exhibit D10," filed with IP Australia in connection with Australian Patent Application No. 2018203659 on Aug. 14, 2019, 33 pages.
"Exhibit D11," filed with IP Australia in connection with Australian Patent Application No. 2018203659 on Aug. 14, 2019, 2 pages.
"Exhibit D12," filed with IP Australia in connection with Australian Patent Application No. 2018203659 on Aug. 14, 2019, 9 pages.
IP Australia, "Opposition—Statement or Grounds and Particulars," issued in connection with Australian Patent Application No. 2018203659 on Aug. 15, 2019, 1 page.
"Minutes of the Public Hearing in Opposition Proceedings Before the Patent Division 44 of the German Patent and Trademark Office," issued in connection with opposition of German Patent No. 102013110501.7, Apr. 17, 2018, 6 pages (includes English translation).
*EIS, Inc.* v. *Wow Tech International GmbH*, "First Amended Complaint," filed with the United States District Court for the District of Delware, case No. 1:19-cv-01227-LPS, Sep. 9, 2019, 40 pages.
*EIS, Inc.* v. *Wow Tech International GmbH*, "First Amended Complaint—Exhibits 1-31," filed with the United States District Court for the District of Delware, case No. 1:19-cv-01227-LPS, Sep. 9, 2019, 527 pages.
"Petition for Inter Partes Review of U.S. Pat. No. 9,849,061," filed with the United States Patent and Trademark Office on Oct. 2, 2019, 97 pages.
"Petition for Inter Partes Review of U.S. Pat. No. 9,849,061," Exhibit 1001, filed with the United States Patent and Trademark Office on Oct. 2, 2019, 18 pages.
"Petition for Inter Partes Review of U.S. Pat. No. 9,849,061," Exhibit 1002, filed with the United States Patent and Trademark Office on Oct. 2, 2019, 137 pages. (Uploaded in 5 parts).
"Petition for Inter Partes Review of U.S. Pat. No. 9,849,061," Exhibit 1003, filed with the United States Patent and Trademark Office on Oct. 2, 2019, 1,367 pages. (Uploaded in 5 parts).
"Petition for Inter Partes Review of U.S. Pat. No. 9,849,061," Exhibit 1004, filed with the United States Patent and Trademark Office on Oct. 2, 2019, 9 pages.
"Petition for Inter Partes Review of U.S. Pat. No. 9,849,061," Exhibit 1006, filed with the United States Patent and Trademark Office on Oct. 2, 2019, 34 pages.
"Petition for Inter Partes Review of U.S. Pat. No. 9,849,061," Exhibit 1007, filed with the United States Patent and Trademark Office on Oct. 2, 2019, 22 pages.
"Petition for Inter Partes Review of U.S. Pat. No. 9,849,061," Exhibit 1008, filed with the United States Patent and Trademark Office on Oct. 2, 2019, 40 pages.
"Petition for Inter Partes Review of U.S. Pat. No. 9,849,061," Exhibit 1010, filed with the United States Patent and Trademark Office on Oct. 2, 2019, 5 pages.
"Petition for Inter Partes Review of U.S. Pat. No. 9,849,061," Exhibit 1011, filed with the United States Patent and Trademark Office on Oct. 2, 2019, 17 pages.
"Petition for Inter Partes Review of U.S. Pat. No. 9,849,061," Exhibit 1012, filed with the United States Patent and Trademark Office on Oct. 2, 2019, 61 pages.
"Petition for Inter Partes Review of U.S. Pat. No. 9,849,061," Exhibit 1013, filed with the United States Patent and Trademark Office on Oct. 2, 2019, 46 pages.
"Notification of an Opposition," issued by the European Patent Office in connection with European Patent No. EP2976057 on Sep. 12, 2019, opposition filed by EIS GmbH, 132 pages (includes English translation).
"Notification of an Opposition," issued by the European Patent Office in connection with European Patent No. EP2976057 on Sep. 10, 2019, opposition filed by Fun Factory Ltd., 117 pages (includes English translation).
"Notification of an Opposition," issued by the European Patent Office in connection with European Patent No. EP2976057 on Sep. 12, 2019, opposition filed by Hu Xiaorong, 35 pages (includes English translation).
"Opposition to a European Patent," filed with the European Patent Office by EIS GmbH in connection with European Patent No. EP3308762 on Sep. 11, 2019 95 pages (includes English translation).
"Opposition to a European Patent," filed with the European Patent Office by Fun Factory Ltd. in connection with European Patent No. EP3308762 on Sep. 11, 2019, 124 pages (includes English translation).
IP Australia, "Examination Report," issued in connection with Austrailian Application No. 2018222907 dated Sep. 3, 2019, 4 pages.
IP Australia, "Examination Report," issued in connection with Austrailian Application No. 2019201070 dated Jul. 9, 2019, 4 pages.
Korean Patent Office, "Office Action," issued in connection with Korean Application No. 10-2017-0129112 dated Aug. 29, 2019, 9 pages (includes English summary of Office action.
Korean Patent Office, "Office Action," issued in connection with Korean Application No. 10-2017-7028845 dated Sep. 18, 2019, 7 pages (includes English summary of Office action.
European Patent Office, "Notice of Submission of Third Party Observation," issued in connection with European Application No. EP172023 94.7 on Jul. 9, 2019, 5 pages (submission in English).
"Opposition Document," filed in connection with opposition of German Patent No. 102013110501.7 on Jan. 24, 2018, 69 pages (includes English translation).
"English Translation of Grounds of Appeal," filed in connection with opposition of German Patent No. 102013110501.7 on Dec. 21, 2018, 44 pages (includes Eglish translation of Exhibit B1).
"English Translation of Exhibit B2 of Grounds of Appeal," filed with the German Patent and Trademark in connection with opposition of German Patent No. 102013110501.7 on Dec. 21, 2018, 11 pages.
United States Patent and Trademark Office, "Final Office Action," issued in connection with U.S. Appl. No. 15/888,568 dated Oct. 29, 2019, 7 pages.
United States Patent and Trademark Office, "Corrected Notice of Allowability," issued in connection with U.S. Appl. No. 15/354,599 dated Nov. 12, 2019, 2 pages.
German Patent and Trademark Office, "English Translation of Invitation to Speak," issued in connection with opposition of German Patent No. 102013110501.7 on Nov. 17, 2016, 20 pages.
"English Translation of Patentee Submission," filed with the German Patent and Trademark Office in connection with opposition of German Patent No. 102013110501.7 on Sep. 18, 2017, 38 pages.
"English Translation of Submission of Opponent," filed with the German Patent and Trademark Office in connection with opposition of German Patent No. 102013110501.7 on Oct. 5, 2017, 6 pages.
"English Translation of Submission of Opponent," filed with the German Patent and Trademark Office in connection with opposition of German Patent No. 102013110501.7 on Nov. 13, 2017, 8 pages.
German Patent and Trademark Office, "English Translation of Summons to Attend Oral Proceedings," issued in connection with opposition of German Patent No. 102013110501.7 on Nov. 28, 2017, 3 pages.
"English Translation of Patentee Submission," filed with the German Patent and Trademark Office in connection with opposition of German Patent No. 102013110501.7 on Jan. 30, 2018, 5 pages.
German Patent and Trademark Office, "English Translation of Additions to Summons," issued in connection with opposition of German Patent No. 102013110501.7 on Nov. 24, 2017, 1 page.
German Patent and Trademark Office, "English Translation of Summons to Attend Oral Proceedings," issued in connection with opposition of German Patent No. 102013110501.7 on Feb. 2, 2018, 3 pages.
"English Translation of Opponent Submission," filed with the German Patent and Trademark Office in connection with opposition of German Patent No. 102013110501.7 on Mar. 14, 2018, 5 pages.

(56) References Cited

OTHER PUBLICATIONS

"English Translation of Patentee Submission," filed with the German Patent and Trademark Office in connection with opposition of German Patent No. 102013110501.7 on Apr. 3, 2018, 2 pages.
"English Translation of Patentee Submission," filed with the German Patent and Trademark Office, in connection with opposition of German Patent No. 102013110501.7 on Apr. 12, 2018, 45 pages.
"English Translation of Auxiliary Request 1," filed with the German Patent and Trademark Office in connection with opposition of German Patent No. 2013110501.7 on Apr. 16, 2018, 5 pages.
"English Translation of Auxiliary Request 2," filed with the German Patent and Trademark Office in connection with opposition of German Patent No. 2013110501.7 on Apr. 16, 2018, 6 pages.
"English Translation of Auxiliary Request 3," filed with the German Patent and Trademark Office in connection with opposition of German Patent No. 2013110501.7 on Apr. 16, 2018, 5 pages.
*Novoluto GmbH* v. *EIS GmbH*, "Judgment," issued by the German Court in connection with German litigation proceeding on Dec. 14, 2017, 71 pages (includes English translation).
*Novoluto GmbH* v. *EIS GmbH*, "Transcript," filed with the German Court in connection German litigation proceeding on Jul. 20, 2017, 44 pages (includes English translation).
*Novoluto GmbH* v. *EIS GmbH*, "Complaint," filed the German Court in connection German litigation proceeding on Aug. 5, 2016, 75 pages (includes English translation).
United States Patent and Trademark Office, "Notice of Filing Date Accorded to Petition and Time for Filing Patent Owner Preliminary Response," issued in connection with IPR2019-01302 on Jul. 18, 2019, 5 pages.
"Patent Owner's Amended Mandatory Notices Pursuant to 37 C.F.R. 42.8," filed with the United States Patent and Trademark Office in connection with Case IPR2019-01302 on Sep. 3, 2019, 6 pages.
"Patent Owner's Amended Mandatory Notices Pursuant to 37 C.F.R. 42.8," filed with the United States Patent and Trademark Office in connection with Case IPR2019-01302 on Sep. 30, 2019, 6 pages.
"Patent Owner's Amended Mandatory Notices Pursuant to 37 C.F.R. 42.8," filed with the United States Patent and Trademark Office in connection with Case IPR2019-01302 on Oct. 18, 2019, 6 pages.
"Patent Owner's Mandatory Notices," filed with the United States Patent and Trademark Office in connection with Case IPR2019-01302 on Jul. 24, 2019, 4 pages.
"Patent Owner's Updated Mandatory Notices," filed with the United States Patent and Trademark Office in connection with Case IPR2019-01302 on Aug. 21, 2019, 4 pages.
"Petitioner's Amended Mandatory Notices Pursuant To 37 C.F.R. 42.8," filed with the United States Patent and Trademark Office in connection with Case IPR2019-01302 on Oct. 8, 2019, 5 pages.
"Patent Owner's Preliminary Response Pursuant To 37 C.F.R. § 42.107," filed with the United States Patent and Trademark Office in connection with Case IPR2019-01302 on Oct. 18, 2019, 85 pages.
"Patent Owner's Preliminary Response Pursuant to 37 C.F.R. § 42.107," Exhibit 2001, filed with the United States Patent and Trademark Office in connection with Case IPR2019-01302 on Oct. 18, 2019, 80 pages.
"Patent Owner's Preliminary Response Pursuant to 37 C.F.R. § 42.107," Exhibit 2002, filed with the United States Patent and Trademark Office in connection with Case IPR2019-01302 on Oct. 18, 2019, 30 pages.
"Patent Owner's Preliminary Response Pursuant to 37 C.F.R. § 42.107," Exhibit 2003, filed with the United States Patent and Trademark Office in connection with Case IPR2019-01302 on Oct. 18, 2019, 18 pages.
"Patent Owner's Preliminary Response Pursuant to 37 C.F.R. § 42.107," Exhibit 2004, filed with the United States Patent and Trademark Office in connection with Case IPR2019-01302 on Oct. 18, 2019, 47 pages.
"Patent Owner's Preliminary Response Pursuant to 37 C.F.R. § 42.107," Exhibit 2005, filed with the United States Patent and Trademark Office in connection with Case IPR2019-01302 on Oct. 18, 2019, 60 pages.
"Patent Owner's Preliminary Response Pursuant to 37 C.F.R. § 42.107," Exhibit 2006, filed with the United States Patent and Trademark Office in connection with Case IPR2019-01302 on Oct. 18, 2019, 19 pages.
"Patent Owner's Preliminary Response Pursuant to 37 C.F.R. § 42.107," Exhibit 2007, filed with the United States Patent and Trademark Office in connection with Case IPR2019-01302 on Oct. 18, 2019, 16 pages.
"Patent Owner's Preliminary Response Pursuant to 37 C.F.R. § 42.107," Exhibit 2008, filed with the United States Patent and Trademark Office in connection with Case IPR2019-01302 on Oct. 18, 2019, 10 pages.
"Patent Owner's Preliminary Response Pursuant to 37 C.F.R. § 42.107," Exhibit 2009, filed with the United States Patent and Trademark Office in connection with Case IPR2019-01302 on Oct. 18, 2019, 12 pages.
"Patent Owner's Preliminary Response Pursuant to 37 C.F.R. § 42.107," Exhibit 2010, filed with the United States Patent and Trademark Office in connection with Case IPR2019-01302 on Oct. 18, 2019, 9 pages.
"Patent Owner's Preliminary Response Pursuant to 37 C.F.R. § 42.107," Exhibit 2011, filed with the United States Patent and Trademark Office in connection with Case IPR2019-01302 on Oct. 18, 2019, 2 pages.
"Patent Owner's Preliminary Response Pursuant to 37 C.F.R. § 42.107," Exhibit 2012, filed with the United States Patent and Trademark Office in connection with Case IPR2019-01302 on Oct. 18, 2019, 7 pages.
"Patent Owner's Preliminary Response Pursuant to 37 C.F.R. § 42.107," Exhibit 2013, filed with the United States Patent and Trademark Office in connection with Case IPR2019-01302 on Oct. 18, 2019, 4 pages.
"Patent Owner's Preliminary Response Pursuant to 37 C.F.R. § 42.107," Exhibit 2014, filed with the United States Patent and Trademark Office in connection with Case IPR2019-01302 on Oct. 18, 2019, 77 pages.
"Patent Owner's Preliminary Response Pursuant to 37 C.F.R. § 42.107," Exhibit 2015, filed with the United States Patent and Trademark Office in connection with Case IPR2019-01302 on Oct. 18, 2019, 76 pages.
"Patent Owner's Preliminary Response Pursuant to 37 C.F.R. § 42.107," Exhibit 2016, filed with the United States Patent and Trademark Office in connection with Case IPR2019-01302 on Oct. 18, 2019, 169 pages.
"Patent Owner's Preliminary Response Pursuant to 37 C.F.R. § 42.107," Exhibit 2017, filed with the United States Patent and Trademark Office in connection with Case IPR2019-01302 on Oct. 18, 2019, 40 pages.
"Patent Owner's Preliminary Response Pursuant to 37 C.F.R. § 42.107," Exhibit 2018, filed with the United States Patent and Trademark Office in connection with Case IPR2019-01302 on Oct. 18, 2019, 15 pages.
"Patent Owner's Preliminary Response Pursuant to 37 C.F.R. § 42.107," Exhibit 2019, filed with the United States Patent and Trademark Office in connection with Case IPR2019-01302 on Oct. 18, 2019, 8 pages.
"Patent Owner's Preliminary Response Pursuant to 37 C.F.R. § 42.107," Exhibit 2020, filed with the United States Patent and Trademark Office in connection with Case IPR2019-01302 on Oct. 18, 2019, 11 pages.
"Patent Owner's Preliminary Response Pursuant to 37 C.F.R. § 42.107," Exhibit 2021, filed with the United States Patent and Trademark Office in connection with Case IPR2019-01302 on Oct. 18, 2019, 25 pages.
"Patent Owner's Preliminary Response Pursuant to 37 C.F.R. § 42.107," Exhibit 2022, filed with the United States Patent and Trademark Office in connection with Case IPR2019-01302 on Oct. 18, 2019, 97 pages.

(56) References Cited

OTHER PUBLICATIONS

"Patent Owner's Preliminary Response Pursuant to 37 C.F.R. § 42.107," Exhibit 2023, filed with the United States Patent and Trademark Office in connection with Case IPR2019-01302 on Oct. 18, 2019, 4 pages.
"Patent Owner's Preliminary Response Pursuant to 37 C.F.R. § 42.107," Exhibit 2024, filed with the United States Patent and Trademark Office in connection with Case IPR2019-01302 on Oct. 18, 2019, 7 pages.
"Patent Owner's Preliminary Response Pursuant to 37 C.F.R. § 42.107," Exhibit 2025, filed with the United States Patent and Trademark Office in connection with Case IPR2019-01302 on Oct. 18, 2019, 1 page.
United States Patent and Trademark Office, "Notice of Filing Date Accorded to Petition and Time for Filing Patent Owner Preliminary Response," issued in connection with Case IPR2019-01444 on Aug. 14, 2019, 6 pages.
"Patent Owner's Amended Mandatory Notices Pursuant to 37 C.F.R. 42.8," filed with the United States Patent and Trademark Office in connection with case IPR2019-01444 on Aug. 26, 2019, 6 pages.
"Patent Owner's Amended Mandatory Notices Pursuant to 37 C.F.R. 42.8," filed with the United States Patent and Trademark Office in connection with case IPR2019-01444 on Sep. 30, 2019, 6 pages.
"Patent Owner's Amended Mandatory Notices Pursuant to 37 C.F.R. 42.8," filed with the United States Patent and Trademark Office in connection with case IPR2019-01444 on Oct. 23, 2019, 6 pages.
"Patent Owner's Mandatory Notices," filed with the United States Patent and Trademark Office in connection with case IPR2019-01444 on Aug. 21, 2019, 5 pages.
"Petitioner's Amended Mandatory Notices," filed with the United States Patent and Trademark Office in connection with case IPR2019-01444 on Oct. 8, 2019, 5 pages.
"Patent Owner's Preliminary Response Pursuant to 37 C.F.R. § 42.107," filed with the United States Patent and Trademark Office in connection with case IPR2019-01444 on Nov. 14, 2019, 88 pages.
"Patent Owner's Preliminary Response Pursuant to 37 C.F.R. § 42.107," Exhibit 2001, filed with the United States Patent and Trademark Office in connection with Case IPR2019-01444 on Nov. 14, 2019, 81 pages.
"Patent Owner's Preliminary Response Pursuant to 37 C.F.R. § 42.107," Exhibit 2002, filed with the United States Patent and Trademark Office in connection with Case IPR2019-01444 on Nov. 14, 2019, 36 pages.
"Patent Owner's Preliminary Response Pursuant to 37 C.F.R. § 42.107," Exhibit 2003, filed with the United States Patent and Trademark Office in connection with Case IPR2019-01444 on Nov. 14, 2019, 18 pages.
"Patent Owner's Preliminary Response Pursuant to 37 C.F.R. § 42.107," Exhibit 2004, filed with the United States Patent and Trademark Office in connection with Case IPR2019-01444 on Nov. 14, 2019, 97 pages.
"Patent Owner's Preliminary Response Pursuant to 37 C.F.R. § 42.107," Exhibit 2005, filed with the United States Patent and Trademark Office in connection with Case IPR2019-01444 on Nov. 14, 2019, 61 pages.
"Patent Owner's Preliminary Response Pursuant to 37 C.F.R. § 42.107," Exhibit 2006, filed with the United States Patent and Trademark Office in connection with Case IPR2019-01444 on Nov. 14, 2019, 60 pages.
"Patent Owner's Preliminary Response Pursuant to 37 C.F.R. § 42.107," Exhibit 2007, filed with the United States Patent and Trademark Office in connection with Case IPR2019-01444 on Nov. 14, 2019, 22 pages.
"Patent Owner's Preliminary Response Pursuant to 37 C.F.R. § 42.107," Exhibit 2008, filed with the United States Patent and Trademark Office in connection with Case IPR2019-01444 on Nov. 14, 2019, 12 pages.
"Patent Owner's Preliminary Response Pursuant to 37 C.F.R. § 42.107," Exhibit 2009, filed with the United States Patent and Trademark Office in connection with Case IPR2019-01444 on Nov. 14, 2019, 7 pages.
"Patent Owner's Preliminary Response Pursuant to 37 C.F.R. § 42.107," Exhibit 2010, filed with the United States Patent and Trademark Office in connection with Case IPR2019-01444 on Nov. 14, 2019, 16 pages.
"Patent Owner's Preliminary Response Pursuant to 37 C.F.R. § 42.107," Exhibit 2011, filed with the United States Patent and Trademark Office in connection with Case IPR2019-01444 on Nov. 14, 2019, 10 pages.
"Patent Owner's Preliminary Response Pursuant to 37 C.F.R. § 42.107," Exhibit 2012, filed with the United States Patent and Trademark Office in connection with Case IPR2019-01444 on Nov. 14, 2019, 12 pages.
"Patent Owner's Preliminary Response Pursuant to 37 C.F.R. § 42.107," Exhibit 2013, filed with the United States Patent and Trademark Office in connection with Case IPR2019-01444 on Nov. 14, 2019, 9 pages.
"Patent Owner's Preliminary Response Pursuant to 37 C.F.R. § 42.107," Exhibit 2014, filed with the United States Patent and Trademark Office in connection with Case IPR2019-01444 on Nov. 14, 2019, 2 pages.
"Patent Owner's Preliminary Response Pursuant to 37 C.F.R. § 42.107," Exhibit 2015, filed with the United States Patent and Trademark Office in connection with Case IPR2019-01444 on Nov. 14, 2019, 4 pages.
"Patent Owner's Preliminary Response Pursuant to 37 C.F.R. § 42.107," Exhibit 2016, filed with the United States Patent and Trademark Office in connection with Case IPR2019-01444 on Nov. 14, 2019, 172 pages.
"Patent Owner's Preliminary Response Pursuant to 37 C.F.R. § 42.107," Exhibit 2017, filed with the United States Patent and Trademark Office in connection with Case IPR2019-01444 on Nov. 14, 2019, 40 pages.
"Patent Owner's Preliminary Response Pursuant to 37 C.F.R. § 42.107," Exhibit 2018, filed with the United States Patent and Trademark Office in connection with Case IPR2019-01444 on Nov. 14, 2019, 153 pages.
"Patent Owner's Preliminary Response Pursuant to 37 C.F.R. § 42.107," Exhibit 2019, filed with the United States Patent and Trademark Office in connection with Case IPR2019-01444 on Nov. 14, 2019, 4 pages.
"Patent Owner's Preliminary Response Pursuant to 37 C.F.R. § 42.107," Exhibit 2020, filed with the United States Patent and Trademark Office in connection with Case IPR2019-01444 on Nov. 14, 2019, 3 pages.
"Patent Owner's Preliminary Response Pursuant to 37 C.F.R. § 42.107," Exhibit 2021, filed with the United States Patent and Trademark Office in connection with Case IPR2019-01444 on Nov. 14, 2019, 7 pages.
"Patent Owner's Preliminary Response Pursuant to 37 C.F.R. § 42.107," Exhibit 2022, filed with the United States Patent and Trademark Office in connection with Case IPR2019-01444 on Nov. 14, 2019, 11 pages.
"Patent Owner's Preliminary Response Pursuant to 37 C.F.R. § 42.107," Exhibit 2023, filed with the United States Patent and Trademark Office in connection with Case IPR2019-01444 on Nov. 14, 2019, 8 pages.
"Patent Owner's Preliminary Response Pursuant to 37 C.F.R. § 42.107," Exhibit 2024, filed with the United States Patent and Trademark Office in connection with Case IPR2019-01444 on Nov. 14, 2019, 20 pages.
"Patent Owner's Preliminary Response Pursuant to 37 C.F.R. § 42.107," Exhibit 2025, filed with the United States Patent and Trademark Office in connection with Case IPR2019-01444 on Nov. 14, 2019, 3 pages.
"Patent Owner's Preliminary Response Pursuant to 37 C.F.R. § 42.107," Exhibit 2026, filed with the United States Patent and Trademark Office in connection with Case IPR2019-01444 on Nov. 14, 2019, 9 pages.

(56) References Cited

OTHER PUBLICATIONS

"Patent Owner's Preliminary Response Pursuant to 37 C.F.R. § 42.107," Exhibit 2027, filed with the United States Patent and Trademark Office in connection with Case IPR2019-01444 on Nov. 14, 2019, 4 pages.
"Patent Owner's Preliminary Response Pursuant to 37 C.F.R. § 42.107," Exhibit 2028, filed with the United States Patent and Trademark Office in connection with Case IPR2019-01444 on Nov. 14, 2019, 7 pages.
"Patent Owner's Preliminary Response Pursuant to 37 C.F.R. § 42.107," Exhibit 2029, filed with the United States Patent and Trademark Office in connection with Case IPR2019-01444 on Nov. 14, 2019, 3 pages.
"Patent Owner's Preliminary Response Pursuant to 37 C.F.R. § 42.107," Exhibit 2030, filed with the United States Patent and Trademark Office in connection with Case IPR2019-01444 on Nov. 14, 2019, 4 pages.
"Patent Owner's Preliminary Response Pursuant to 37 C.F.R. § 42.107," Exhibit 2031, filed with the United States Patent and Trademark Office in connection with Case IPR2019-01444 on Nov. 14, 2019, 7 pages.
"Patent Owner's Preliminary Response Pursuant to 37 C.F.R. § 42.107," Exhibit 2032, filed with the United States Patent and Trademark Office in connection with Case IPR2019-01444 on Nov. 14, 2019, 4 pages.
"Patent Owner's Preliminary Response Pursuant to 37 C.F.R. § 42.107," Exhibit 2033, filed with the United States Patent and Trademark Office in connection with Case IPR2019-01444 on Nov. 14, 2019, 25 pages.
"Patent Owner's Preliminary Response Pursuant to 37 C.F.R. § 42.107," Exhibit 2034, filed with the United States Patent and Trademark Office in connection with Case IPR2019-01444 on Nov. 14, 2019, 3 pages.
United States Patent and Trademark Office, "Notice of Filing Date Accorded to Petition and Time for Filing Patent Owner Preliminary Response," issued in connection with Case IPR2020-00007 on Oct. 8, 2019, 5 pages.
"Patent Owner's Amended Mandatory Notices Pursuant to 37 C.F.R. 42.8," filed with the United States Patent and Trademark Office in connection with case IPR2020-00007 on Oct. 23, 2019, 6 pages.
*EIS, Inc.* v. *Wow Tech International GmbH*, "Declaration of Frank Ferrari in Support of Defendants, Wow Tech International GmbH, Wow Tech Canada Ltd., and Novoluto GmbH's Consolidated Motion to Dismiss," filed with the United States District Court for the District of Delaware in connection with Case No. 1:19-cv-1277-LPS on Oct. 2, 2019, 3 pages.
*EIS, Inc.* v. *Wow Tech International GmbH*, "Declaration of Florian Holst in Support of Defendants, Wow Tech International GmbH, Wow Tech Canada Ltd., and Novoluto GmbH's Consolidated Motion to Dismiss," filed with the United States District Court for the District of Delaware in connection with Case No. 1:19-cv-1277-LPS on Oct. 2, 2019, 3 pages.
*EIS, Inc.* v. *Wow Tech International GmbH*, "Declaration Of Johannes Plettenberg in Support of Defendants, Wow Tech International GmbH, Wow Tech Canada Ltd., and Novoluto GmbH's Consolidated Motion to Dismiss," filed with the United States District Court for the District of Delaware in connection with Case No. 1:19-cv-1277-LPS on Oct. 2, 2019, 3 pages.
*EIS, Inc.* v. *Wow Tech International GmbH*, "Defendants' Consolidated Motion to Dismiss EIS, Inc.'s Complaint Pursuant to Federal Rules Of Civil Procedure 12(B)(2) and 12(b)(6)," filed with the United States District Court for the District of Delaware in connection with Case No. 1:19-cv-1277-LPS on Oct. 2, 2019, 3 pages.
*EIS, Inc.* v. *Wow Tech International GmbH*, "Defendants' Opening Brief in Support of their Consolidated Motion to Dismiss Pursuant to Federal Rules of Civil Procedure 12(B)(2) and 12(B)(6)," filed with the United States District Court for the District of Delaware in connection with Case No. 1:19-cv-1277-LPS on Oct. 2, 2019, 42 pages.

The International Bureau of WIPO, "English Translation of International Report on Patentability," issued in connection with application No. PCT/EP2017/075400, on Apr. 9, 2019, 12 pages.
Israel Patent Office, "Office Action," issued in connection with Israeli Patent Application No. 254607, dated Dec. 1, 2019, 6 pages (includes English translation).
Canadian Patent Office, "Office Action," issued in connection with Canadian Patent Application No. 3,051,672, dated Oct. 3, 2019, 7 pages.
United States Patent and Trademark Office, "Notice of Allowance," issued in connection with U.S. Appl. No. 15/354,599, dated Dec. 16, 2019, 21 pages.
"Patent Owner's Preliminary Response Pursuant to 37 C.F.R. § 42.107," filed with the United States Patent and Trademark Office in connection with case IPR2020-00007 on Jan. 8, 2020, 87 pages.
"Patent Owner's Preliminary Response Pursuant to 37 C.F.R. § 42.107," Exhibit 2001, filed with the United States Patent and Trademark Office in connection with Case IPR2020-00007 on Jan. 8, 2020, 72 pages.
"Patent Owner's Preliminary Response Pursuant to 37 C.F.R. § 42.107," Exhibit 2002, filed with the United States Patent and Trademark Office in connection with Case IPR2020-00007 on Jan. 8, 2020, 36 pages.
"Patent Owner's Preliminary Response Pursuant to 37 C.F.R. § 42.107," Exhibit 2003, filed with the United States Patent and Trademark Office in connection with Case IPR2020-00007 on Jan. 8, 2020, 3 pages.
"Patent Owner's Preliminary Response Pursuant to 37 C.F.R. § 42.107," Exhibit 2004, filed with the United States Patent and Trademark Office in connection with Case IPR2020-00007 on Jan. 8, 2020, 62 pages.
"Patent Owner's Preliminary Response Pursuant to 37 C.F.R. § 42.107," Exhibit 2005, filed with the United States Patent and Trademark Office in connection with Case IPR2020-00007 on Jan. 8, 2020, 60 pages.
"Patent Owner's Preliminary Response Pursuant to 37 C.F.R. § 42.107," Exhibit 2006, filed with the United States Patent and Trademark Office in connection with Case IPR2020-00007 on Jan. 8, 2020, 4 pages.
"Patent Owner's Preliminary Response Pursuant to 37 C.F.R. § 42.107," Exhibit 2007, filed with the United States Patent and Trademark Office in connection with Case IPR2020-00007 on Jan. 8, 2020, 5 pages.
"Patent Owner's Preliminary Response Pursuant to 37 C.F.R. § 42.107," Exhibit 2008, filed with the United States Patent and Trademark Office in connection with Case IPR2020-00007 on Jan. 8, 2020, 10 pages.
"Patent Owner's Preliminary Response Pursuant to 37 C.F.R. § 42.107," Exhibit 2009, filed with the United States Patent and Trademark Office in connection with Case IPR2020-00007 on Jan. 8, 2020, 4 pages.
"Patent Owner's Preliminary Response Pursuant to 37 C.F.R. § 42.107," Exhibit 2010, filed with the United States Patent and Trademark Office in connection with Case IPR2020-00007 on Jan. 8, 2020, 14 pages.
"Patent Owner's Preliminary Response Pursuant to 37 C.F.R. § 42.107," Exhibit 2011, filed with the United States Patent and Trademark Office in connection with Case IPR2020-00007 on Jan. 8, 2020, 16 pages.
"Patent Owner's Preliminary Response Pursuant to 37 C.F.R. § 42.107," Exhibit 2012, filed with the United States Patent and Trademark Office in connection with Case IPR2020-00007 on Jan. 8, 2020, 12 pages.
"Patent Owner's Preliminary Response Pursuant to 37 C.F.R. § 42.107," Exhibit 2013, filed with the United States Patent and Trademark Office in connection with Case IPR2020-00007 on Jan. 8, 2020, 9 pages.
"Patent Owner's Preliminary Response Pursuant to 37 C.F.R. § 42.107," Exhibit 2014, filed with the United States Patent and Trademark Office in connection with Case IPR2020-00007 on Jan. 8, 2020, 2 pages.

(56) References Cited

OTHER PUBLICATIONS

"Patent Owner's Preliminary Response Pursuant to 37 C.F.R. § 42.107," Exhibit 2015, filed with the United States Patent and Trademark Office in connection with Case IPR2020-00007 on Jan. 8, 2020, 7 pages.

"Patent Owner's Preliminary Response Pursuant to 37 C.F.R. § 42.107," Exhibit 2016, filed with the United States Patent and Trademark Office in connection with Case IPR2020-00007 on Jan. 8, 2020, 4 pages.

"Patent Owner's Preliminary Response Pursuant to 37 C.F.R. § 42.107," Exhibit 2017, filed with the United States Patent and Trademark Office in connection with Case IPR2020-00007 on Jan. 8, 2020, 77 pages.

"Patent Owner's Preliminary Response Pursuant to 37 C.F.R. § 42.107," Exhibit 2018, filed with the United States Patent and Trademark Office in connection with Case IPR2020-00007 on Jan. 8, 2020, 76 pages.

"Patent Owner's Preliminary Response Pursuant to 37 C.F.R. § 42.107," Exhibit 2019, filed with the United States Patent and Trademark Office in connection with Case IPR2020-00007 on Jan. 8, 2020, 169 pages.

"Patent Owner's Preliminary Response Pursuant to 37 C.F.R. § 42.107," Exhibit 2020, filed with the United States Patent and Trademark Office in connection with Case IPR2020-00007 on Jan. 8, 2020, 40 pages.

"Patent Owner's Preliminary Response Pursuant to 37 C.F.R. § 42.107," Exhibit 2021, filed with the United States Patent and Trademark Office in connection with Case IPR2020-00007 on Jan. 8, 2020, 7 pages.

"Patent Owner's Preliminary Response Pursuant to 37 C.F.R. § 42.107," Exhibit 2022, filed with the United States Patent and Trademark Office in connection with Case IPR2020-00007 on Jan. 8, 2020, 6 pages.

"Patent Owner's Preliminary Response Pursuant to 37 C.F.R. § 42.107," Exhibit 2023, filed with the United States Patent and Trademark Office in connection with Case IPR2020-00007 on Jan. 8, 2020, 8 pages.

"Patent Owner's Preliminary Response Pursuant to 37 C.F.R. § 42.107," Exhibit 2024, filed with the United States Patent and Trademark Office in connection with Case IPR2020-00007 on Jan. 8, 2020, 3 pages.

"Patent Owner's Preliminary Response Pursuant to 37 C.F.R. § 42.107," Exhibit 2025, filed with the United States Patent and Trademark Office in connection with Case IPR2020-00007 on Jan. 8, 2020, 3 pages.

"Patent Owner's Preliminary Response Pursuant to 37 C.F.R. § 42.107," Exhibit 2026, filed with the United States Patent and Trademark Office in connection with Case IPR2020-00007 on Jan. 8, 2020, 13 pages.

"Patent Owner's Preliminary Response Pursuant to 37 C.F.R. § 42.107," Exhibit 2027, filed with the United States Patent and Trademark Office in connection with Case IPR2020-00007 on Jan. 8, 2020, 4 pages.

"Patent Owner's Preliminary Response Pursuant to 37 C.F.R. § 42.107," Exhibit 2029, filed with the United States Patent and Trademark Office in connection with Case IPR2020-00007 on Jan. 8, 2020, 25 pages.

"Patent Owner's Preliminary Response Pursuant to 37 C.F.R. § 42.107," Exhibit 2030, filed with the United States Patent and Trademark Office in connection with Case IPR2020-00007 on Jan. 8, 2020, 3 pages.

"Patent Owner's Preliminary Response Pursuant to 37 C.F.R. § 42.107," Exhibit 2031, filed with the United States Patent and Trademark Office in connection with Case IPR2020-00007 on Jan. 8, 2020, 4 pages.

"Decision Denying Insitution of Inter Partes Review," issued by the United States Patent and Trademark Office in connection with Case IPR2019-01302 on Januaiy 13, 2020, 21 pages.

*EIS, Inc.* v. *Wow Tech International GmbH*, "Letter to the Honorable Leonard P. Stark from Jack B. Blumenfeld regarding Discovery Dispute," filed with the United States District Court for the District of Delaware in connection with Case No. 1:19-cv-1277-LPS on Dec. 5, 2019, 176 pages.

*EIS, Inc.* v. *Wow Tech International GmbH*, "Letter to the Honorable Leonard P. Stark from Paul D. Brown regarding Discovery Dispute," filed with the United States District Court for the District of Delaware in connection with Case No. 1:19-cv-1277-LPS on Dec. 6, 2019, 4 pages.

United Stated Patent and Trademark Office, "Notice of Allowance," issued in connection with U.S. Appl. No. 15/719,085, dated Oct. 15, 2019, 12 pages.

"Evidence in Support," filed with IP Australia in connection with Australian Patent Application No. 2018203659 on Nov. 8, 2019, 245 pages.

IP Australia, "Opposition—Evidence," issued in connection with Australian Patent Application No. 2018203659 on Nov. 12, 2019, 1 page.

"Decision Denying Insitution of Inter Partes Review," issued by the United States Patent and Trademark Office in connection with Case IPR2019-01444 on Feb. 10, 2020, 16 pages.

"Summary of Opponent's Submissions," filed with IP Australia in connection with Australian Patent Application No. 2015386680 on Feb. 5, 2020, 39 pages.

United States Patent and Trademark Office, "Non-Final Office action," issued in connection with U.S. Appl. No. 15/023,471, dated Aug. 26, 2016, 26 pages.

United States Patent and Trademark Office, "Final Office action," issued in connection with U.S. Appl. No. 15/023,471, dated Jan. 6, 2017, 29 pages.

United States Patent and Trademark Office, "Notice of Allowance and Fee(s) Due," issued in connection with U.S. Appl. No. 15/023,471, dated May 12, 2017, 48 pages.

United States Patent and Trademark Office, "Non-Final Office action," issued in connection with U.S. Appl. No. 15/302,981, dated Jun. 2, 2017, 36 pages.

United States Patent and Trademark Office, "Non-Final Office action," issued in connection with U.S. Appl. No. 15/487,123, dated Jun. 2, 2017, 16 pages.

United States Patent and Trademark Office, "Final Office action," issued in connection with U.S. Appl. No. 15/487,123, dated Sep. 29, 2017, 7 pages.

United States Patent and Trademark Office, "Notice of Allowance and Fee(s) Due," issued in connection with U.S. Appl. No. 15/302,981, dated Oct. 12, 2017, 5 pages.

United States Patent and Trademark Office, "Restriction Requirement," issued in connection with U.S. Appl. No. 15/719,085, dated Nov. 8, 2017, 6 pages.

United States Patent and Trademark Office, "Supplemental Notice of Allowability," issued in connection with U.S. Appl. No. 15/302,981, dated Nov. 17, 2017, 7 pages.

United States Patent and Trademark Office, "Notice of Allowance and Fee(s) Due," issued in connection with U.S. Appl. No. 15/487,123, dated Dec. 11, 2017, 5 pages.

United States Patent and Trademark Office, "Non Final Office action," issued in connection with U.S. Appl. No. 15/719,085, dated Jan. 25, 2018, 15 pages.

United States Patent and Trademark Office, "Corrected Notice of Allowability," issued in connection with U.S. Appl. No. 15/487,123, dated Mar. 13, 2018, 6 pages.

United States Patent and Trademark Office, "Non-Final Office action," issued in connection with U.S. Appl. No. 15/354,599, dated Dec. 29, 2017, 46 pages.

United States Patent and Trademark Office, "Notice of Allowance and Fee(s) Due," issued in connection with U.S. Appl. No. 15/719,085, dated Dec. 12, 2018, 11 pages.

United States Patent and Trademark Office, "Non-Final Office action," issued in connection with U.S. Appl. No. 15/888,568, dated Jan. 10, 2019, 15 pages.

United States Patent and Trademark Office, "Supplemental Notice of Allowability," issued in connection with U.S. Appl. No. 15/719,085, dated Jan. 11, 2019, 9 pages.

(56) References Cited

OTHER PUBLICATIONS

United States Patent and Trademark Office, "Notice of Allowance and Fee(s) Due," issued in connection with U.S. Appl. No. 15/719,085, dated Mar. 20, 2019, 12 pages.
United States Patent and Trademark Office, "Non-Final Office action," issued in connection with U.S. Appl. No. 15/354,599, dated Feb. 24, 2017, 38 pages.
United States Patent and Trademark Office, "Final Office action," issued in connection with U.S. Appl. No. 15/354,599, dated Sep. 12, 2017, 47 pages.
United States Patent and Trademark Office, "Notice of Allowance and Fee(s) Due," issued in connection with Design U.S. Appl. No. 29/590,450, dated May 8, 2018, 7 pages.
United States Patent and Trademark Office, "Notice of Allowance and Fee(s) Due," issued in connection with Design U.S. Appl. No. 35/502,986, dated May 1, 2018, 9 pages.
United States Patent and Trademark Office, "Non-Final Office Action," issued in connection with U.S. Appl. No. 15/965,208, dated Aug. 22, 2019, 17 pages.
United Stated Patent and Trademark Office, "Notice of Allowance," issued in connection with U.S. Appl. No. 15/719,085, dated Jul. 3, 2019, 12 pages.
European Patent Office, "Search Report," issued in connection with European Application No. 20174260, dated Sep. 22, 2020, 18 pages (includes English translation).
International Searching Authority, "International Search Report," issued in connection with International Application No. PCT/DE2019/100860, dated Dec. 18, 2019, 6 pages (includes English machine translation).
International Searching Authority, "Written Opinion," issued in connection with International Application No. PCT/DE2019/100860, dated Dec. 18, 2019, 14 pages (includes English machine translation).
IP Australia, "Opposition—Decision Issued," issued in connection with Australian Patent Application No. 2018203659 on Jan. 5, 2021, 35 pages.
IP Australia, "Notice of Opposition," issued in connection with Australian Patent Application No. 2018222907 on Dec. 4, 2020, 110 pages.
Gillan et al., "Vaginal and Pelvic Floor Responses to Sexual Stimulation," Psychophysiology, vol. 16, No. 5 (Sep. 1979), pp. 471-481, 1 page (Abstract only provided).
"Petitioner's Reply to Patent Owner's Response," filed with the United States Patent and Trademark Office in connection with Case IPR2019-01302 on Dec. 4, 2020, 41 pages.
"Petitioner's Reply to Patent Owner's Response," Exhibit 1018, filed with the United States Patent and Trademark Office in connection with Case IPR2019-01302 on Dec. 4, 2020, 79 pages.
"Petitioner's Reply to Patent Owner's Response," Exhibit 1019, filed with the United States Patent and Trademark Office in connection with Case IPR2019-01302 on Dec. 4, 2020, 4 pages.
"Petitioner's Reply to Patent Owner's Response," Exhibit 1020, filed with the United States Patent and Trademark Office in connection with Case IPR2019-01302 on Dec. 4, 2020, 55 pages.
"Petitioner's Reply to Patent Owner's Response," Exhibit 1021, filed with the United States Patent and Trademark Office in connection with Case IPR2019-01302 on Dec. 4, 2020, 16 pages.
"Petitioner's Reply to Patent Owner's Response," Exhibit 1022, filed with the United States Patent and Trademark Office in connection with Case IPR2019-01302 on Dec. 4, 2020, 258 pages.
"Petitioner's Reply to Patent Owner's Response," Exhibit 1023, filed with the United States Patent and Trademark Office in connection with Case IPR2019-01302 on Dec. 4, 2020, 234 pages.
"Petitioner's Reply to Patent Owner's Response," Exhibit 1024, filed with the United States Patent and Trademark Office in connection with Case IPR2019-01302 on Dec. 4, 2020, 19 pages.
"Petitioner's Reply to Patent Owner's Response," Exhibit 1025, filed with the United States Patent and Trademark Office in connection with Case IPR2019-01302 on Dec. 4, 2020, 22 pages.
"Petitioner's Reply to Patent Owner's Response," Exhibit 1026, filed with the United States Patent and Trademark Office in connection with Case IPR2019-01302 on Dec. 4, 2020, 3 pages.
"Petitioner's Reply to Patent Owner's Response," Exhibit 1027, filed with the United States Patent and Trademark Office in connection with Case IPR2019-01302 on Dec. 4, 2020, 4 pages.
"Petitioner's Reply to Patent Owner's Response," Exhibit 1028, filed with the United States Patent and Trademark Office in connection with Case IPR2019-01302 on Dec. 4, 2020, 4 pages.
"Petitioner's Reply to Patent Owner's Response," Exhibit 1029, filed with the United States Patent and Trademark Office in connection with Case IPR2019-01302 on Dec. 4, 2020, 9 pages.
"Petitioner's Reply to Patent Owner's Response," Exhibit 1030, filed with the United States Patent and Trademark Office in connection with Case IPR2019-01302 on Dec. 4, 2020, 9 pages.
"Petitioner's Reply to Patent Owner's Response," Exhibit 1031, filed with the United States Patent and Trademark Office in connection with Case IPR2019-01302 on Dec. 4, 2020, 18 pages.
"Petitioner's Reply to Patent Owner's Response," Exhibit 1032, filed with the United States Patent and Trademark Office in connection with Case IPR2019-01302 on Dec. 4, 2020, 15 pages.
"Petitioner's Reply to Patent Owner's Response," Exhibit 1033, filed with the United States Patent and Trademark Office in connection with Case IPR2019-01302 on Dec. 4, 2020, 17 pages.
"Petitioner's Reply to Patent Owner's Response," Exhibit 1034, filed with the United States Patent and Trademark Office in connection with Case IPR2019-01302 on Dec. 4, 2020, 2 pages.
"Petitioner's Reply to Patent Owner's Response," Exhibit 1035, filed with the United States Patent and Trademark Office in connection with Case IPR2019-01302 on Dec. 4, 2020, 11 pages.
"Petitioner's Reply to Patent Owner's Response," Exhibit 1036, filed with the United States Patent and Trademark Office in connection with Case IPR2019-01302 on Dec. 4, 2020, 7 pages.
"Petitioner's Reply to Patent Owner's Response," Exhibit 1037, filed with the United States Patent and Trademark Office in connection with Case IPR2019-01302 on Dec. 4, 2020, 17 pages.
"Petitioner's Reply to Patent Owner's Response," Exhibit 1038, filed with the United States Patent and Trademark Office in connection with Case IPR2019-01302 on Dec. 4, 2020, 16 pages.
"Petitioner's Reply to Patent Owner's Response," Exhibit 1039, filed with the United States Patent and Trademark Office in connection with Case IPR2019-01302 on Dec. 4, 2020, 29 pages.
"Petitioner's Reply to Patent Owner's Response," Exhibit 1040, filed with the United States Patent and Trademark Office in connection with Case IPR2019-01302 on Dec. 4, 2020, 74 pages.
"Petitioner's Reply to Patent Owner's Response," Exhibit 1041, filed with the United States Patent and Trademark Office in connection with Case IPR2019-01302 on Dec. 4, 2020, 1 page.
"Petitioner's Reply to Patent Owner's Response," Exhibit 1042, filed with the United States Patent and Trademark Office in connection with Case IPR2019-01302 on Dec. 4, 2020, 1 page.
"Petitioner's Reply to Patent Owner's Response," Exhibit 1043, filed with the United States Patent and Trademark Office in connection with Case IPR2019-01302 on Dec. 4, 2020, 6 pages.
"Petitioner's Reply to Patent Owner's Response," Exhibit 1044, filed with the United States Patent and Trademark Office in connection with Case IPR2019-01302 on Dec. 4, 2020, 136 pages.
"Petitioner's Reply to Patent Owner's Response," Exhibit 1045, filed with the United States Patent and Trademark Office in connection with Case IPR2019-01302 on Dec. 4, 2020, 1 page.
"Petitioner's Reply to Patent Owner's Response," Exhibit 1046, filed with the United States Patent and Trademark Office in connection with Case IPR2019-01302 on Dec. 4, 2020, 1 page.
"Petitioner's Reply to Patent Owner's Response," Exhibit 1047, filed with the United States Patent and Trademark Office in connection with Case IPR2019-01302 on Dec. 4, 2020, 4 pages.
"Petitioner's Reply to Patent Owner's Response," Exhibit 1048, filed with the United States Patent and Trademark Office in connection with Case IPR2019-01302 on Dec. 4, 2020, 5 pages.
"Petitioner's Reply to Patent Owner's Response," Exhibit 1049, filed with the United States Patent and Trademark Office in connection with Case IPR2019-01302 on Dec. 4, 2020, 4 pages.

(56) References Cited

OTHER PUBLICATIONS

"Petitioner's Reply to Patent Owner's Response," Exhibit 1050, filed with the United States Patent and Trademark Office in connection with Case IPR2019-01302 on Dec. 4, 2020, 9 pages.
"Patent Owner's Amended Mandatory Notices Pursuant to 37 C.F.R. 42.8," filed with the United States Patent and Trademark Office in connection with Case IPR2019-01302 on Jan. 12, 2021, 9 pages.
"Patent Owner's Sur-Reply Pursuant to 37 C.F.R. 42.23," filed with the United States Patent and Trademark Office in connection with Case IPR2019-01302 on Jan. 15, 2021, 38 pages.
"Patent Owner's Sur-Reply Pursuant to 37 C.F.R. 42.23," Exhibit 2048, filed with the United States Patent and Trademark Office in connection with Case IPR2019-01302 on Jan. 15, 2021, 39 pages.
"Patent Owner's Sur-Reply Pursuant to 37 C.F.R. 42.23," Exhibit 2049, filed with the United States Patent and Trademark Office in connection with Case IPR2019-01302 on Jan. 15, 2021, 13 pages.
"Patent Owner's Sur-Reply Pursuant to 37 C.F.R. 42.23," Exhibit 2050, filed with the United States Patent and Trademark Office in connection with Case IPR2019-01302 on Jan. 15, 2021, 14 pages.
"Patent Owner's Sur-Reply Pursuant to 37 C.F.R. 42.23," Exhibit 2051, filed with the United States Patent and Trademark Office in connection with Case IPR2019-01302 on Jan. 15, 2021, 3 pages.
"Petitioner's Reply to Patent Owner's Response," filed with the United States Patent and Trademark Office in connection with Case IPR2019-01444 on Jan. 26, 2021, 41 pages.
"Petitioner's Reply to Patent Owner's Response," Exhibit 1013, filed with the United States Patent and Trademark Office in connection with Case IPR2019-01444 on Jan. 26, 2021, 32 pages.
"Petitioner's Reply to Patent Owner's Response," Exhibit 1014, filed with the United States Patent and Trademark Office in connection with Case IPR2019-01444 on Jan. 26, 2021, 29 pages.
"Petitioner's Reply to Patent Owner's Response," Exhibit 1015, filed with the United States Patent and Trademark Office in connection with Case IPR2019-01444 on Jan. 26, 2021, 196 pages.
"Petitioner's Reply to Patent Owner's Response," Exhibit 1016, filed with the United States Patent and Trademark Office in connection with Case IPR2019-01444 on Jan. 26, 2021, 253 pages.
"Petitioner's Reply to Patent Owner's Response," Exhibit 1017, filed with the United States Patent and Trademark Office in connection with Case IPR2019-01444 on Jan. 26, 2021, 88 pages.
"Petitioner's Reply to Patent Owner's Response," Exhibit 1018, filed with the United States Patent and Trademark Office in connection with Case IPR2019-01444 on Jan. 26, 2021, 93 pages.
"Petitioner's Reply to Patent Owner's Response," Exhibit 1019, filed with the United States Patent and Trademark Office in connection with Case IPR2019-01444 on Jan. 26, 2021, 4 pages.
"Petitioner's Reply to Patent Owner's Response," Exhibit 1020, filed with the United States Patent and Trademark Office in connection with Case IPR2019-01444 on Jan. 26, 2021, 41 pages.
"Petitioner's Reply to Patent Owner's Response," Exhibit 1021, filed with the United States Patent and Trademark Office in connection with Case IPR2019-01444 on Jan. 26, 2021, 16 pages.
"Petitioner's Reply to Patent Owner's Response," Exhibit 1022, filed with the United States Patent and Trademark Office in connection with Case IPR2019-01444 on Jan. 26, 2021, 258 pages.
"Petitioner's Reply to Patent Owner's Response," Exhibit 1023, filed with the United States Patent and Trademark Office in connection with Case IPR2019-01444 on Jan. 26, 2021, 234 pages.
"Petitioner's Reply to Patent Owner's Response," Exhibit 1024, filed with the United States Patent and Trademark Office in connection with Case IPR2019-01444 on Jan. 26, 2021, 11 pages.
"Petitioner's Reply to Patent Owner's Response," Exhibit 1025, filed with the United States Patent and Trademark Office in connection with Case IPR2019-01444 on Jan. 26, 2021, 6 pages.
"Petitioner's Reply to Patent Owner's Response," Exhibit 1026, filed with the United States Patent and Trademark Office in connection with Case IPR2019-01444 on Jan. 26, 2021, 3 pages.
"Petitioner's Reply to Patent Owner's Response," Exhibit 1027, filed with the United States Patent and Trademark Office in connection with Case IPR2019-01444 on Jan. 26, 2021, 4 pages.
"Petitioner's Reply to Patent Owner's Response," Exhibit 1028, filed with the United States Patent and Trademark Office in connection with Case IPR2019-01444 on Jan. 26, 2021, 4 pages.
"Petitioner's Reply to Patent Owner's Response," Exhibit 1029, filed with the United States Patent and Trademark Office in connection with Case IPR2019-01444 on Jan. 26, 2021, 9 pages.
"Petitioner's Reply to Patent Owner's Response," Exhibit 1030, filed with the United States Patent and Trademark Office in connection with Case IPR2019-01444 on Jan. 26, 2021, 9 pages.
"Petitioner's Reply to Patent Owner's Response," Exhibit 1031, filed with the United States Patent and Trademark Office in connection with Case IPR2019-01444 on Jan. 26, 2021, 18 pages.
"Petitioner's Reply to Patent Owner's Response," Exhibit 1032, filed with the United States Patent and Trademark Office in connection with Case IPR2019-01444 on Jan. 26, 2021, 15 pages.
"Petitioner's Reply to Patent Owner's Response," Exhibit 1033, filed with the United States Patent and Trademark Office in connection with Case IPR2019-01444 on Jan. 26, 2021, 17 pages.
"Petitioner's Reply to Patent Owner's Response," Exhibit 1034, filed with the United States Patent and Trademark Office in connection with Case IPR2019-01444 on Jan. 26, 2021, 2 pages.
"Petitioner's Reply to Patent Owner's Response," Exhibit 1035, filed with the United States Patent and Trademark Office in connection with Case IPR2019-01444 on Jan. 26, 2021, 11 pages.
"Petitioner's Reply to Patent Owner's Response," Exhibit 1036, filed with the United States Patent and Trademark Office in connection with Case IPR2019-01444 on Jan. 26, 2021, 18 pages.
"Petitioner's Reply to Patent Owner's Response," Exhibit 1037, filed with the United States Patent and Trademark Office in connection with Case IPR2019-01444 on Jan. 26, 2021, 17 pages.
"Petitioner's Reply to Patent Owner's Response," Exhibit 1038, filed with the United States Patent and Trademark Office in connection with Case IPR2019-01444 on Jan. 26, 2021, 16 pages.
"Petitioner's Reply to Patent Owner's Response," Exhibit 1039, filed with the United States Patent and Trademark Office in connection with Case IPR2019-01444 on Jan. 26, 2021, 5 pages.
"Petitioner's Reply to Patent Owner's Response," Exhibit 1040, filed with the United States Patent and Trademark Office in connection with Case IPR2019-01444 on Jan. 26, 2021, 74 pages.
"Petitioner's Reply to Patent Owner's Response," Exhibit 1041, filed with the United States Patent and Trademark Office in connection with Case IPR2019-01444 on Jan. 26, 2021, 5 pages.
"Petitioner's Reply to Patent Owner's Response," Exhibit 1043, filed with the United States Patent and Trademark Office in connection with Case IPR2019-01444 on Jan. 26, 2021, 6 pages.
"Petitioner's Reply to Patent Owner's Response," Exhibit 1044, filed with the United States Patent and Trademark Office in connection with Case IPR2019-01444 on Jan. 26, 2021, 136 pages.
"Petitioner's Reply to Patent Owner's Response," Exhibit 1045, filed with the United States Patent and Trademark Office in connection with Case IPR2019-01444 on Jan. 26, 2021, 1 page.
"Petitioner's Reply to Patent Owner's Response," Exhibit 1046, filed with the United States Patent and Trademark Office in connection with Case IPR2019-01444 on Jan. 26, 2021, 1 page.
"Petitioner's Reply to Patent Owner's Response," Exhibit 1047, filed with the United States Patent and Trademark Office in connection with Case IPR2019-01444 on Jan. 26, 2021, 4 pages.
"Petitioner's Reply to Patent Owner's Response," Exhibit 1048, filed with the United States Patent and Trademark Office in connection with Case IPR2019-01444 on Jan. 26, 2021, 5 pages.
"Petitioner's Reply to Patent Owner's Response," Exhibit 1049, filed with the United States Patent and Trademark Office in connection with Case IPR2019-01444 on Jan. 26, 2021, 4 pages.
"Petitioner's Reply to Patent Owner's Response," Exhibit 1050, filed with the United States Patent and Trademark Office in connection with Case IPR2019-01444 on Jan. 26, 2021, 12 pages.
*EIS, Inc.* v. *Wow Tech International GmbH*, "Memorandum Opinion," issued by the United States District Court for the District of Delaware in connection with Case No. 1:19-cv-01227-LPS on Nov. 30, 2020, 26 pages.

(56) References Cited

OTHER PUBLICATIONS

*EIS, Inc.* v. *Wow Tech International GmbH*, "Second Amended Complaint," filed with the United States District Court for the District of Delaware in connection with Case No. 1:19-cv-01227-LPS on Dec. 22, 2020, 748 pages. (Uploaded in two parts.).

United States Patent and Trademark Office, "Judgment, Final Written Decision," issued in connection with Case PR2019-01302 on Jun. 14, 2021, 75 pages.

European Patent Office, "Message," issued in connection with opposition of European Patent No. EP3308762 on Jun. 4, 2021, 40 pages (includes English translation).

European Patent Office, "Message," issued in connection with opposition of European Patent No. EP2976057 on Jun. 1, 2021, 35 pages (includes English translation).

\* cited by examiner

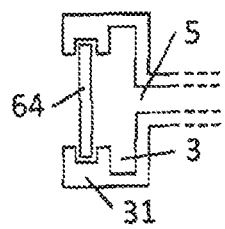
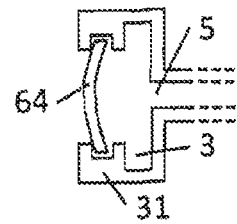
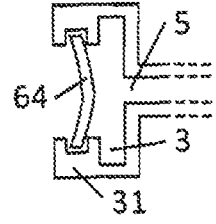
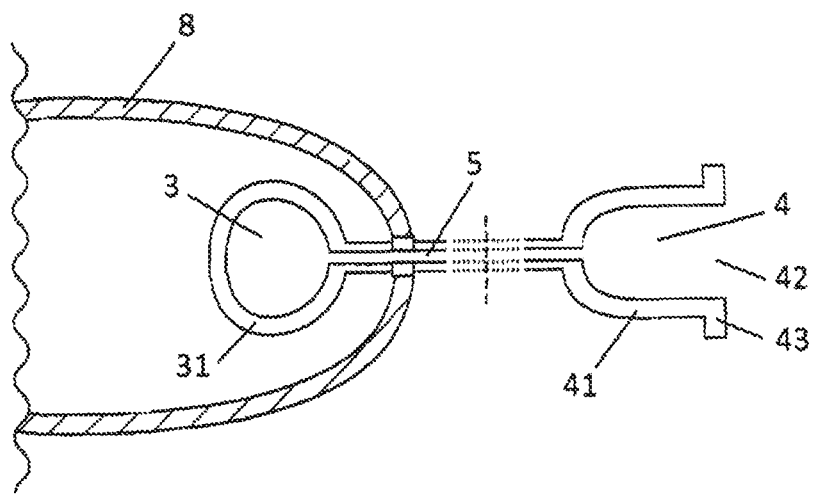
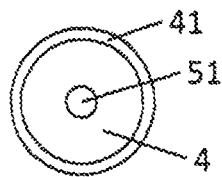
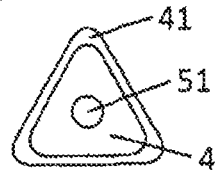
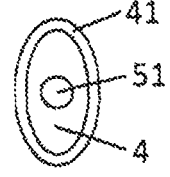
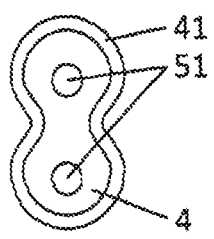
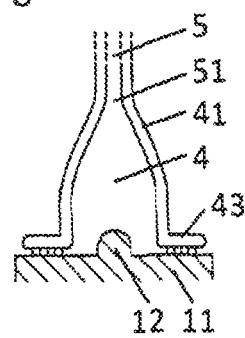
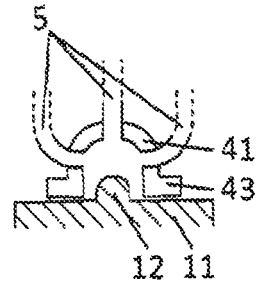

STIMULATION DEVICE

CROSS-REFERENCE TO RELATED APPLICATIONS

This patent is a Continuation of U.S. patent application Ser. No. 15/354,599, filed Nov. 17, 2016, now U.S. Pat. No. 10,857,063, which is a Continuation of U.S. patent application Ser. No. 15/023,471, filed Mar. 21, 2016, now U.S. Pat. No. 9,763,851, which is a national stage (under 35 U.S.C. 371) of International Patent Application No. PCT/EP2014/065734, filed Jul. 22, 2014, which claims priority to German Patent Application No. 102013110501.7, filed Sep. 23, 2013, the disclosures of which are herein incorporated by reference in their entirety.

TECHNICAL FIELD

Embodiments of the present invention relate to a stimulation device for erogenous zones, in particular for the clitoris, a system with a stimulation device, and methods for stimulating body parts.

BACKGROUND

The erogenous zones of the human body can be stimulated with a variety of tools. For example, vibrators are used to apply a stimulus to a particular area of the skin by direct contact. However, this form of stimulation can lead to irritations or inflammations of the skin. Also, direct contact of the genital area with such tools for individual reasons of hygiene or due to personal reservations, for example, may not be desired.

In particular, the direct stimulation of the clitoris with a clitoral massage vibrator, for example, is fraught with problems, as the clitoris is usually a woman's most sensitive erogenous zone. The entire clitoris is equipped with numerous nerve endings, thus making it particularly touch-sensitive and responsive to sexual stimuli. Here, the clitoris glans, in which the nerve cords of the two thighs meet, should be particularly emphasized. Frequent use of a clitoral massage vibrator for direct stimulation, for example, leads to habituation effects or conditioning of the stimulated erogenous zone and the initial use of such a device may require certain practice or familiarization.

Furthermore, medical studies conducted in 2006 determined the female clitoris as definitive starting point of the female climax and neurologically proved the different qualities of sensation of clitoral (and vaginal) orgasm for the first time. Thus, according to the most recent medical research, the stimulation of the clitoris, rather than the vagina, is considered the starting point of a woman's sexual arousal and thereby the key to female "sexual pleasure".

The sensitivity of the human erogenous zones, such as the clitoris, the inner and outer labia or the nipples, continues to differ greatly individually. The person may be so sensitive that direct stimulation is only possible after prolonged foreplay, and even then only very subtly or ruled out completely. Furthermore, the sensitivity of the corresponding zone can change dramatically from one situation to another or even during a sexual act.

For the aforementioned reasons, various indirect forms of stimulation are common practice as alternatives to direct stimulation.

For indirect stimulation of erogenous zones, and especially the clitoris, conventional vacuum devices are used to arouse the erogenous zones of the person concerned without directly contacting the main area to be stimulated. Thus, for example, vacuum pumps for the primary or secondary female sexual organs are known, which usually have a suction cup for placing on the appropriate area and a hand pump. The negative-pressure exerted by this type of device on the clitoris, for example, generates a negative pressure in the clitoris itself, which is usually lower than the systolic blood pressure. This difference in pressure leads to an enlargement of the clitoris and/or stimulates the blood flow in the affected area. This vascular clitoral engorgement serves both to promote desire by increasing sensitivity and for optical and tactile manipulation. The improved blood circulation also leads to an increased leakage of vaginal moisture which makes the stimulation more pleasurable. However, the manual operation of the hand pump is often annoying or distracting. In addition, the long-term or uninterrupted use of negative-pressure in this device category may lead to habituation effects, which limit the effectiveness of the device in the long run. Moreover, a pure increase in the clitoral blood flow is often insufficient to reach a climax; vacuum pumps are thus often used only as foreplay to achieve the climax with a subsequent direct (pressure) massage of the erogenous zone.

Electrically driven vacuum pumps are also used increasingly instead of manually operated vacuum pumps as well. As an example of this, WO 2006/05 82 91 A2 discloses a device for sexual therapy, wherein the arrangement consists of a tubular suction chamber for the clitoris, an electric vacuum source (vacuum pump) and a plurality of airflow openings. The operation of the vacuum pump generates a permanent airflow or air exchange in the chamber in the area of the clitoris. This has the disadvantageous effect of suctioning the increasingly leaking vaginal moisture caused by the negative-pressure, thus having a drying effect on the stimulated parts of skin. Likewise, the suctioned moist air leads to a contamination of the fluidic subsequent vacuum arrangement, of the vacuum pump for example. Such arrangements with vacuum pumps may thus be hygienically problematic, as vacuum pumps and the associated valves or ventilation components often have dead spaces or blind spots and/or are difficult to clean. Furthermore, the device is meant to treat the blood vessels in the clitoris and not to provide stimulation up to sexual climax.

U.S. Pat. No. 6,099,463 A discloses a clitoris stimulation device with a tubular suction chamber, a vacuum source or a vacuum pump and a plurality of valves, which are used to control the size of the vacuum. The vacuum can also be in cyclic form to achieve a stimulation effect, although habituation effects are also to be expected with this device due to the use of a permanent vacuum. As explained above, the disadvantages relating to hygiene and the dehydration of the skin part to be stimulated are also present here. Likewise, the pressure-related arrangement with a plurality of valves, vacuum pump, etc. is relatively complex.

U.S. Pat. No. 6,464,653 B1 discloses therapeutic devices and methods to generate a clitoral engorgement with the aid of a vacuum generated by a vacuum pump to assist in the treatment of clitoral disorders, such as incontinence. A control valve or modulator that can be correspondingly covered by a finger is used to manually adjust or vary the amount of vacuum in the suction chamber. This requires the user's attention and may be distracting or diverting under certain circumstances. This relatively complex device with additional valves also has the same disadvantages relating to hygiene and dehydration as explained above, although the device is also used for long-term therapeutic purposes and not for short-term sexual stimulation.

WO 2008/028076A2 discloses a therapeutic device for women, which is mainly dedicated to treating sexual disorders. The device includes a combination of indirect stimulation by means of a vacuum chamber and direct stimulation by means of mechanical vibrators and oscillators.

The negative-pressure in this therapeutic device is used to increase the blood flow in the clitoris, while the area of skin is actually stimulated or massaged by means of direct mechanical vibrations/oscillations. Thus, a suction cup for placing on the area of skin to be stimulated is internally connected with a motor via a mechanical connection. The suction cup is extended by the motor once the device is activated, thus increasing the volume of the suction cup. The resulting volume of the suction cup and thus the strength of the vacuum can be adjusted by means of control elements on the device. The air displaced in the device by the suction process is discharged outwardly again via a pipe. The vacuum in this device has only a supporting function, while the actual stimulation ensues directly, which also entails the same disadvantages of a direct stimulation as explained above.

US 2013/001276 9A1 discloses a device in which a pulsating positive-pressure is used for stimulating an air pressure massage. A pump or compressor thus generates a pulsating positive-pressure, which is directed towards the erogenous zone to be stimulated by means of a nozzle. This device disadvantageously causes the affected area of skin to dry out severely or completely. Likewise, there is usually a temperature difference between the temperature of the supplied air and the temperature of the area of skin to be stimulated, which may be felt to be distracting under certain circumstances. The same problems of hygiene as explained above also occur in this device, although in this case any pathogens or germs or other contaminations located in the device are also transported directly to the user's genital area.

Thus, the prior art devices all have the same disadvantage in common, in that the complexity of the arrangements generating negative-pressure or positive-pressure may be high and this device may have problems of hygiene.

Furthermore, the prior art devices have another disadvantage in common, in that habituation effects occur in the event of constant or frequently recurring use of negative-pressures.

Another disadvantage of some of the previously described vacuum devices is, firstly, that the negative-pressure has to be limited by means of a control valve or a vacuum pump and, secondly, that the negative-pressure is supposed to be reduced by means of a manual opening of a release valve, before the suction cup is peeled from the skin. Should one of the valves have a technical defect and/or the user operate the device incorrectly, there may be a risk of injury in certain circumstances.

Thus, in view of the problems as explained above, the problem addressed by the embodiments discussed herein is to provide a stimulation device with a simple construction that is easy and safe to use.

Another problem addressed by the embodiments discussed herein is to provide a stimulation device with an effective stimulation-triggering effect, which is suitable for stimulating an erogenous zone, especially the female clitoris.

In addition, partial problems addressed by the embodiments discussed herein are to provide a device, which prevents the erogenous zones to be stimulated from drying out, is hygienic and prevents habituation effects.

The above problems are addressed by embodiments of the stimulation device described herein. Advantageous developments and embodiments are the subject-matter of other alternative independent claims and dependent claims.

SUMMARY

A stimulation device is provided in accordance with one embodiment. The stimulation device includes a chamber which has a flexible wall portion. In one embodiment, the flexible wall portion may include silicon and may be integral with the chamber. A drive unit of the stimulation device is in physical communication with the flexible wall portion so as to cause deflections of the flexible wall portion in opposing directions, thereby resulting in a changing volume of the chamber. The changing volume of the chamber results in modulated positive and negative pressures with respect to a reference pressure. The modulated positive and negative pressures are applied to a body part (e.g., a clitoris) through an opening of the stimulation device. For example, the opening of the stimulation device may be placed over the body part to apply the modulated positive and negative pressures. The drive unit is controlled by a control device of the stimulation device.

In one embodiment, the stimulation device includes a second chamber. The changing volume of the chamber results in the modulated positive and negative pressures in the second chamber.

In one embodiment, the stimulation device may be a portable hand-held device with a battery. The stimulation device may also have an operating element for adjusting the modulated positive and negative pressures and a light emitting diode for indicating a status of the stimulation device.

In accordance with an embodiment, the stimulation device includes a pressure field generator which has a flexible wall portion. A drive unit of the stimulation device is in physical communication with the flexible wall portion so as to cause deflections of the flexible wall portion in opposing directions, thereby resulting in a changing volume of the pressure field generator. The changing volume of the pressure field generator results in modulated positive and negative pressures with respect to a reference pressure. The modulated positive and negative pressures are applied to a body part through an opening of the stimulation device. The drive unit is controlled by a control device of the stimulation device.

In one embodiment, the pressure field generator includes a first chamber and a second chamber. As such, deflections in the flexible wall portion of the first chamber of the pressure field generator result in the modulated positive and negative pressures in the second chamber of the pressure field generator.

The above-described features and functions of embodiments of the present invention as well as other aspects and features are further described in the following with the aid of a detailed description of preferred embodiments with reference to the enclosed illustrations.

BRIEF DESCRIPTION OF DRAWINGS

The figures show in:

FIGS. 10 a), b) and c) cross-sections through section A-A of a pressure field generator of the stimulation device shown in FIG. 1 according to a fifth aspect of the present invention;

FIG. 11 a partial cross-section through section A-A of a second embodiment of the stimulation device shown in FIG. 1 according to the invention;

FIGS. 12 a) to f) various bottom and side views of other aspects of a second chamber of the present invention;

DESCRIPTION OF PREFERRED EMBODIMENTS

Figure 1:
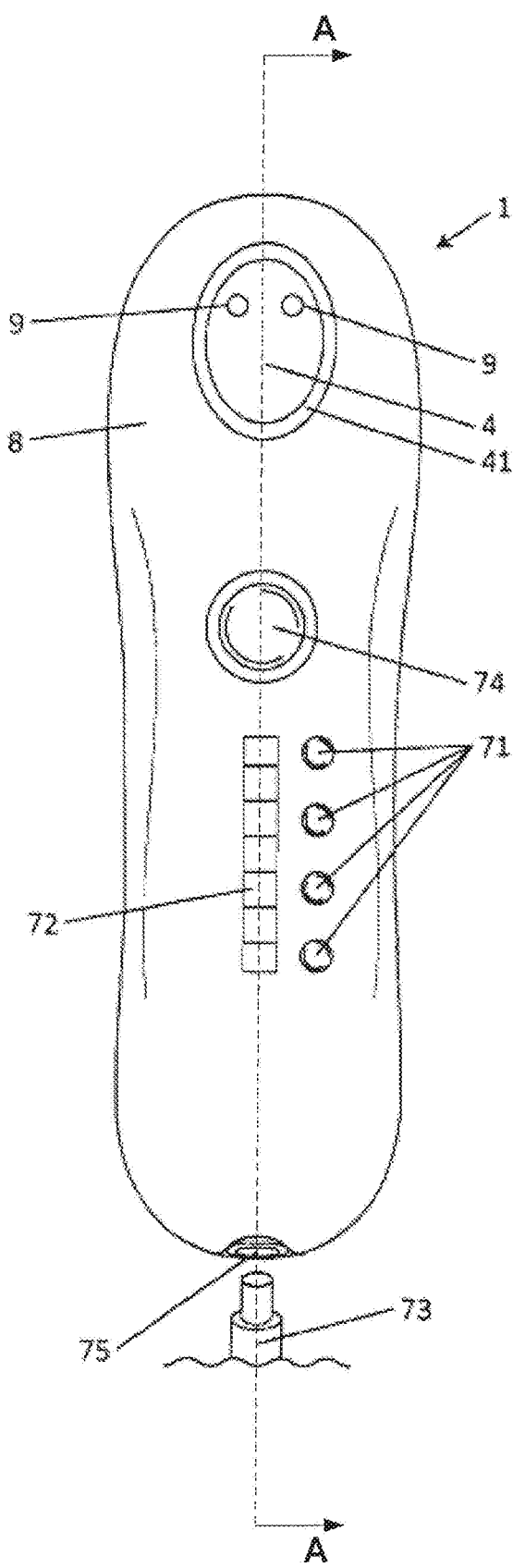
FIG. 1 a front view of a first embodiment of the stimulation device according to the invention.

According to one embodiment, a pressure field generator in the stimulation device has at least one first chamber and at least one second chamber with at least one opening for placing on a body part or on the erogenous zone and at least one connection element that connects the first chamber with the second chamber.

This embodiment of chambers communicating in a fluidic manner via at least one connection element allows the first chamber to simply generate a pressure field in the second chamber by modifying the volume in the first chamber, which is occasionally directed at the area of skin to be stimulated.

A pressure field is a temporally modifiable field of media pressures, with occasional positive-pressures and occasional negative-pressures, a negative-pressure being a media pressure below the reference pressure and a positive-pressure being a media pressure above the reference pressure.

The medium is usually gaseous, preferably air, but may alternatively or additively, for example, be a liquid medium, such as water or commercially available lubricant. For example, the chambers may be filled with the lubricant prior to using the stimulation device. This allows the corresponding area of skin to be stimulated with a suitable skin-friendly liquid in lieu of air as well, whatever the user's individual preference. As another example, the stimulation device may also be used under water with water as the medium (in the bathtub, for example).

The reference pressure is usually the existing ambient pressure in relation to the stimulation device at the beginning of use (i.e. prior to placing the stimulation device on the area of skin to be stimulated). In the preferred use of the stimulation device with air, the reference pressure is the currently existing air pressure or normal pressure.

The pressure field excites the blood circulation of the area of skin to be stimulated, while said area of skin is indirectly massaged, thus combining two advantageous effects. The increased blood circulation makes the erogenous zone of the person concerned more sensitive, while generating an additional massage effect that serves, for example, to stimulate the erogenous zone to sexual arousal up to climax. The massage effect is generated by the kinetic energy of the medium flowing out of the first chamber through the connection element against the surface of the area of skin to be stimulated. The massage effect generated in this way is indirect, i.e. without the area of skin to be stimulated being contacted by a solid body, such as a vibrator, which results in the avoidance of the initially explained disadvantages of direct stimulation.

By the exemplary use of the temporally modifiable pressure field on the clitoris, the pressure field imitates a stimulation that usually only occurs during sexual intercourse. Likewise, the cohabitation movement generates a varying stimulus on the clitoris. It is thus a true-to-life imitation of the natural act of cohabitation, with medical statements confirming that the use of the pressure field causes neither habituation effects nor addiction. This is due in particular to the alternating use of negative- and positive-pressures (or even to the non-continuous use of only one type of pressure).

Furthermore, the maximum applicable pressure is regularly limited by the maximum resilience of the area of skin to be stimulated. Thus, for instance, too high a negative-pressure harbors the risk of painful injury, especially in erogenous zones. Only stimulation devices working with negative-pressures are usually limited to this maximum in their mode of operation. Conversely, the combination of positive- and negative-pressures creates an extended working area of the stimulation-triggering pressure field or effect, as the working area of the pressure can now be exploited to the maximum in both the positive and negative area.

The orientation of the at least one connection element towards the area of skin to be stimulated allows the pressure field to work directly, wherein the pressure field is decisively influenced by the configuration of the at least one connection element and of the at least one opening from the connection element into the second chamber, and is thus adjustable after every use of the stimulation device. Thus, for example, the at least one opening of the connection element may be located opposite and preferably directly opposite the body part to be stimulated. For example, the connection element in a stimulation device intended for the clitoris may have a single passageway with nozzle effect on the clitoris glans between the first and second chamber. Alternatively, the at least one connection element may consist of a plurality, for example four, of passageways between the chambers, if a larger area of skin is to be stimulated.

Furthermore, after placing the halfway or partially opened second chamber on the area of skin to be stimulated, a self-contained system of media- and airflow is created in the pressure field generator. Thus, for instance, the medium or air is moved decisively backwards and forwards between the chambers, while an interchange with media or with air from outside the system being at least largely avoidable. Thus, the first chamber is preferably connected exclusively with the second chamber via or through the connection element. Thus, no first chamber connections other than those to the second chamber exist; for example, there is no direct first chamber connection to the environment of the device via a pressure valve or via an air discharge channel.

For example, the air temperature in the flow system rapidly adjusts to the skin temperature, while the distracting supply of new (possibly cold) air from outside the system is avoided, as may be the case, inter alia, when using vacuum pumps in prior art. Drying effects are also avoided, as very little or no removal of stimulation-promoting fluid, such as bodily fluid, occurs in a closed system.

Furthermore, due to the simple construction, the pressure field generator has the advantage of increased hygiene and improved cleanability. The pressure field generator thus avoids valves or pumps/compressors with potential dead spaces and places that cannot be cleaned. The pressure field generator is thus easy to clean. For example, the stimulation device can be simply cleaned by filling the first chamber with a cleaning agent and activating the pressure field. Alternatively, the second chamber can be arranged to be replaceable, which also simplifies the cleaning of both chambers. Furthermore, the chambers and the connection element of the pressure field generator can be designed in one-piece, wherein the latter consists of a single molded plastic part (e.g. rubber).

In addition, the construction avoids complex fluidic elements, such as valves, which leads to a simplification in production.

Furthermore, the stimulation device has a drive unit, which modifies the volume in the first chamber in such a way that a pressure field is generated via the connection element in the second chamber that serves to stimulate the erogenous zone, and has a control device that activates the drive unit.

As a matter of principle, the medium transported between the chambers is limited to the maximum volume of the first chamber. In addition, the transported volume can be further constructively limited by the maximum possible volume modification caused by the drive unit.

This means that the maximum positive- or negative-pressure the stimulation device can build up in the second chamber is limited due to the dimensioning of the components of the pressure field generator and of the drive. In particular, the maximum positive- or negative-pressure can be limited to degree that minimizes or excludes any risk of injury for the areas of skin to be stimulated. As a result, any conventional safety valve in prior art or any manual intervention in the stimulation process by the user, such as the opening of a release valve, is rendered unnecessary.

Furthermore, the temporal modification of the pressure field or the modification of the pressure field by the control device is automatically controlled to a large extent. Thus, for example, the modulation of the pressure field, such as intensity, chronological sequence or evolvement, can be pre-saved in the control device. As a preference, the temporal modification of the pressure field can have a regular or reoccurring (stimulation) pattern, such as impulses with a stipulated cycle or regularly alternating impulse sequences. This allows the user's interaction with the stimulation device to be limited to switching on and off and selecting the stimulation pattern, while the stimulation device automatically executes the preferred stimulation pattern. Thus, the user complexity of the stimulation device is low, especially when compared with conventional (medical) vacuum stimulation devices. Alternatively, or additionally, the simulation pattern of the stimulation device can be individually configured by the user during or before operation.

In one embodiment, a system includes the stimulation device and a remote control device. The remote control device is arranged separately from the stimulation device, wherein the control device of the stimulation device is remotely controlled by the remote control device. This allows a conventional wireless (via radio for example) or wired remote control to be employed, in order to allow the remote controlled moderation of the stimulation device or the activation thereof by another user.

In one embodiment, a method for stimulating body parts, especially the clitoris, is disclosed. The associated advantages effects and impacts are explained in more detail above in relation to the pressure field.

In one embodiment, the stimulation device is used as a sex toy for stimulating the female clitoris. As explained at the beginning, the female clitoris is an especially erogenous zone of women, which is why the use of an indirect massage combined with a negative-pressure-stimulation for this body part to provide stimulation up to orgasm seems particularly advantageous.

Figure 2:
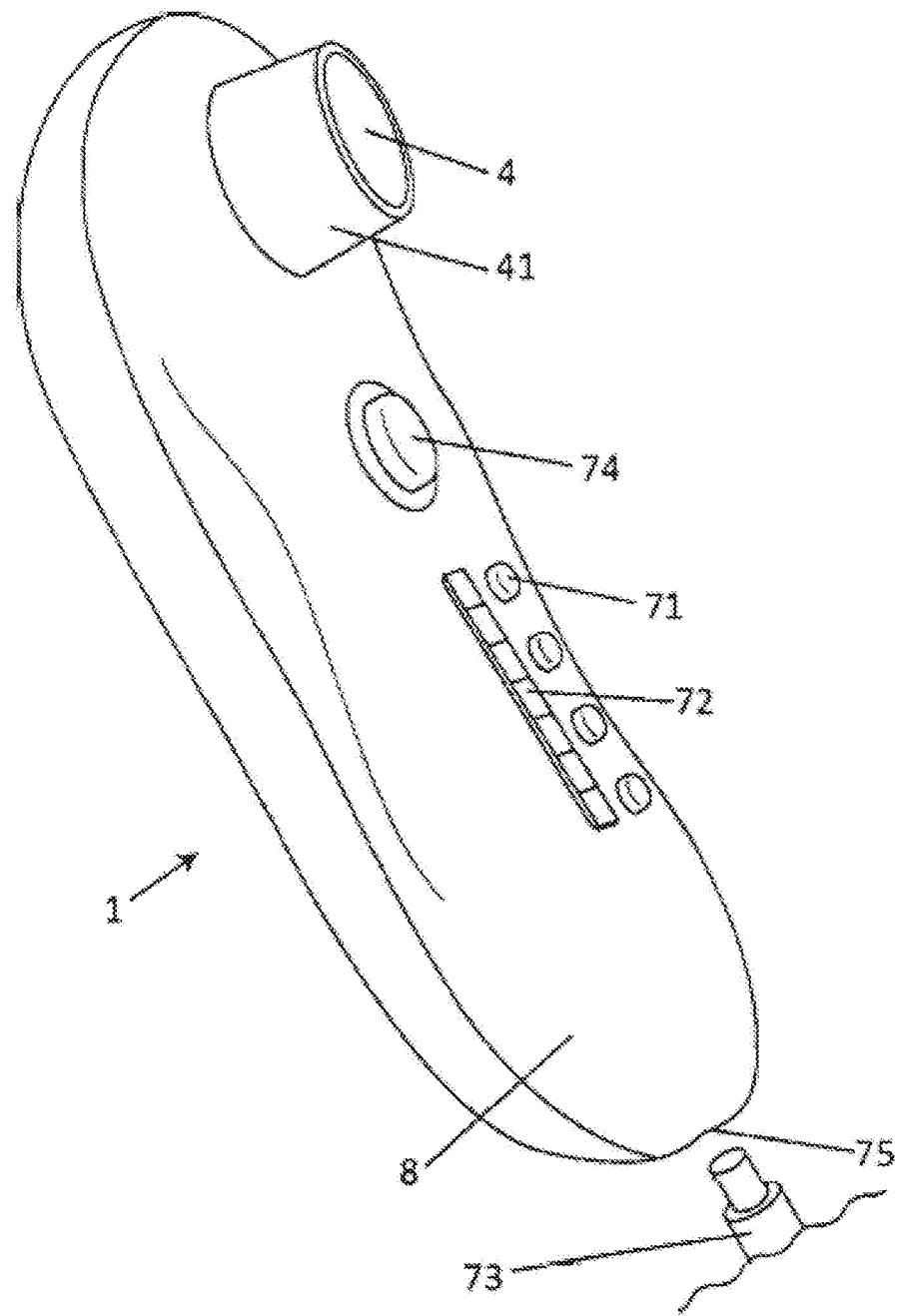
FIG. 2 a perspective side view of the first embodiment of the stimulation device according to the invention.
Figure 3:
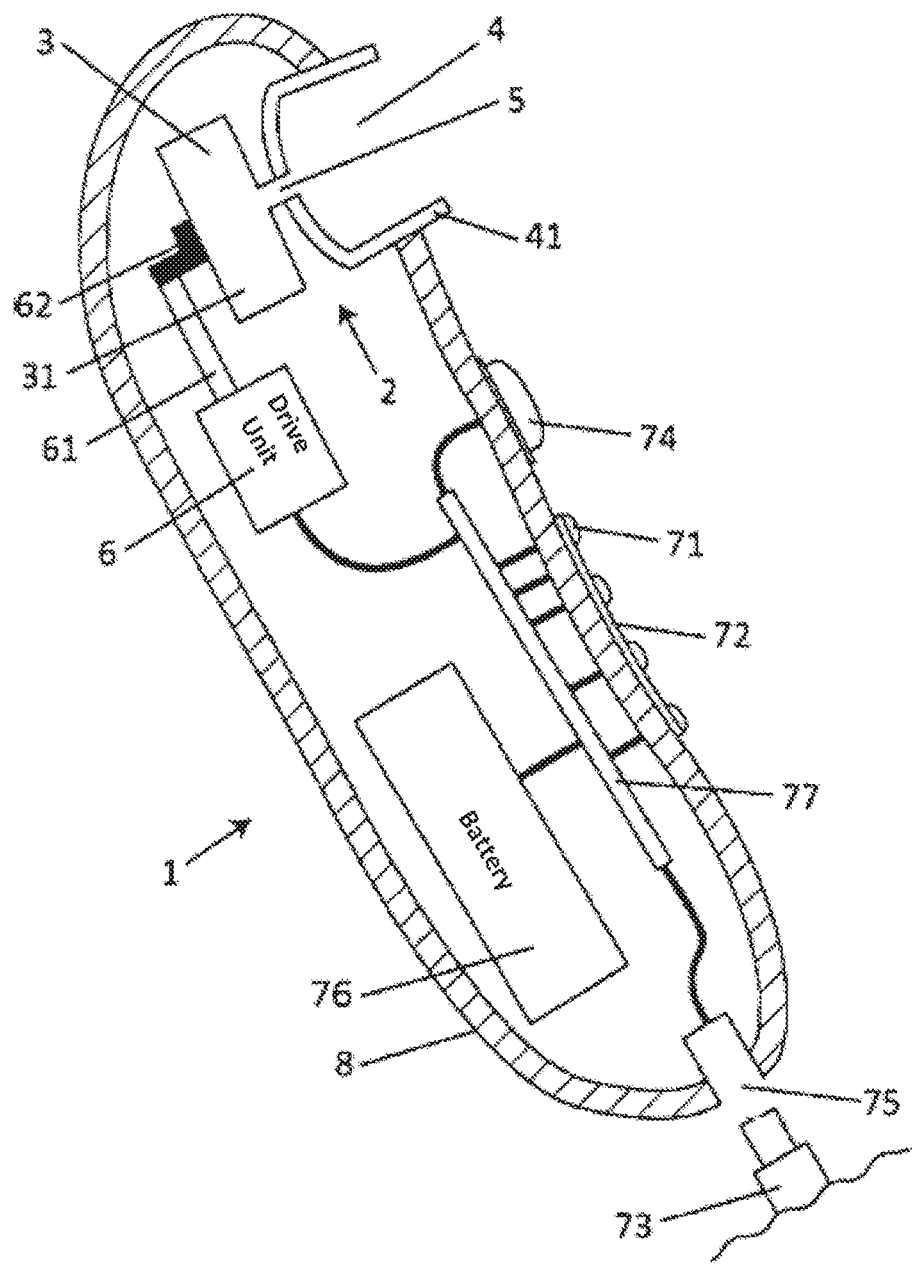
FIG. 3 a cross-section through section A-A of the first embodiment of the stimulation device shown in FIG. 1 according to the invention.

With reference to FIG. 1, a front view of a first embodiment of stimulation device 1 is explained, wherein FIG. 2 shows a perspective view and FIG. 3 a cross-section of the first embodiment of stimulation device 1 according to one or more embodiments.

The first embodiment of stimulation device 1 is a preferably electric or small device, comprising a housing 8, a pressure field generator 2, operating elements 71, a display 72, an on/off switch 74, a socket 75, an optional battery 76 and optional lighting 9.

Housing 8 is preferably designed so ergonomically that it can be held comfortably in one hand and has no sharp or pointed edges. Furthermore, housing 8 may consist of plastic, such as polycarbonate (PC) or acrylonitrile butadiene styrene (ABS). In addition, the gripping areas or even the entire housing may be supplemented by or designed in a haptically advantageous silicone. Housing 8 is preferably designed to be at least water-resistant or splash-proof, for example protection class IP 24.

Operating elements 71 are used to adjust the device operating mode, i.e. to adjust the pressure field modulation pattern. Operating elements 71 can, for example, be designed as at least one pushbutton, as at least one rotary switch, or as at least one touch-sensitive switch. Furthermore, operating elements 71 can produce an optical feedback for activating light emitting diodes (LED) integrated in the center of the switch, for example.

An optional display 72 serves to inform the user of the device status and/or the setting status. Display 72 can for example be configured as a plurality of light diodes or as an LCD display. The displayed information can, for example, be the charge status of an optional battery or the current setting of the modulation pattern.

On/off switch 74 is used for activating and deactivating stimulation device 1. This on/off switch 74 can, for example, be a pushbutton, which switches stimulation device 1 on or off when held down, or a ratcheting slide switch.

A socket 75 is used to supply the external power of stimulation device 1 via an external plug 73, which is connected to an external power adapter, for example. To ensure stimulation device 1 is splash-proof, a magnetic-inductive transformer may be provided instead of the socket, which allows power to be transmitted to stimulation device 1 without any electroconductive contact. Stimulation device 1 preferably also has a battery, such as a nickel metal hydride battery (NiMH) for wireless operation. Alternatively, a (longer) power supply cable may also be led out of the stimulation device.

Pressure field generator 2 of a first embodiment has a first chamber 3 in the interior of stimulation device 1, a second chamber 4 for placing on a body part 11 to be stimulated, and a connection element 5, which connects the first chamber 3 with the second chamber 4.

A drive unit 6, such as an electric motor, drives the first chamber 3 via an axis 61 and by means of an eccentric 62 (or alternatively by means of a connecting rod) in such a way that the volume of the first chamber 3 is modified according to the rotation of axis 61 of drive unit 6. It is hereby annotated that any drive types causing a deflection in wall 31 of the first chamber 3 for volume modification can basically be used in stimulation device 1. The latter may, for example, occur hydraulically, pneumatically, piezoelectrically, mechanically or electromagnetically. Examples of this are described in more detail later on.

A control device 7 activates drive unit 6, operating elements 71 and display 72. Control device 7 and drive unit 6 are supplied with power by internal battery 76 and/or external power supply 73.

Optional lighting 9 is provided on or in housing 8. Lighting 9 is preferably used for lighting the interior of the second chamber 4. Lighting 9 can either be switched by the user or automatically activated by activating stimulation device 1. Furthermore, lighting 9 can be composed of energy-saving light diodes. The lighting can, for example, serve as an orientation aid in the dark for the user of stimulation device 1 or as additional optical stimulation.

Figure 4:
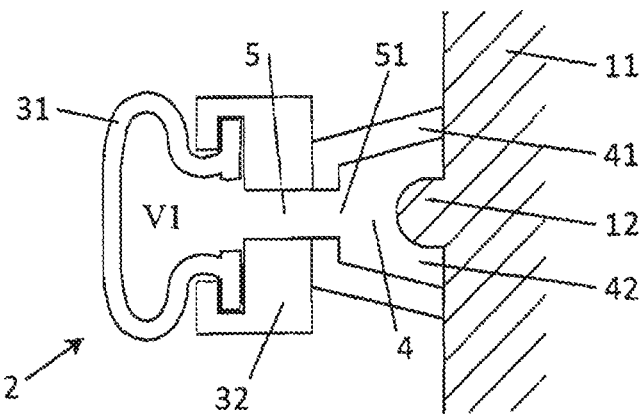
FIG. 4 a cross-section through section A-A of a pressure field generator of the stimulation device shown in FIG. 1 according to a first aspect of the present invention in the first state.
Figure 5:
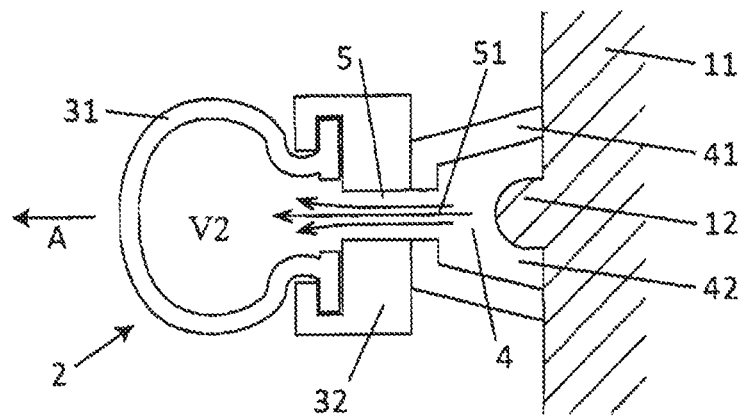
FIG. 5 a cross-section through section A-A of a pressure field generator of the stimulation device shown in FIG. 1 according to a first aspect of the present invention in the second state.
Figure 6:
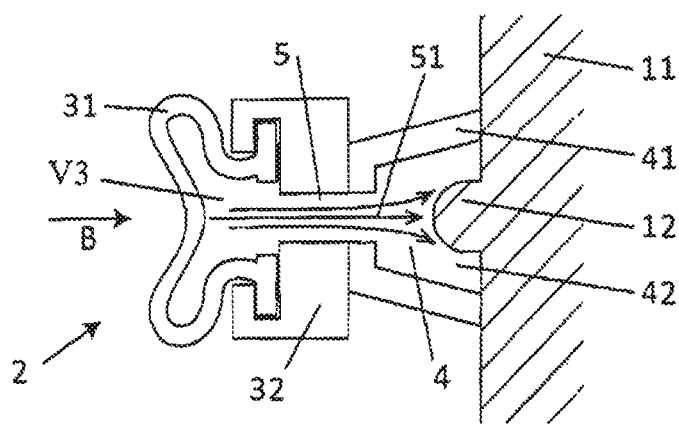
FIG. 6 a cross-section through section A-A of a pressure field generator of the stimulation device shown in FIG. 1 according to a first aspect of the present invention in the third state.

With reference to FIGS. 4, 5 and 6, the construction and function of a first aspect of pressure field generator 2 of stimulation device 1 is subsequently described in more detail.

FIG. 4 shows pressure field generator 2 in a first state, with the second chamber 4 being placed on the area of skin or body part 11 to be stimulated. The first state of pressure field generator 2 is characterized by a neutral deflection of the first chamber 3, i.e. no external force is exerted on the first chamber 3, for example, by the drive unit. Here, volume V1 of the first chamber is the standard volume of this chamber 3.

The body part 11 to be stimulated is an area of skin on the body, wherein for example an especially sensitive erogenous zone, clitoris 12, is shown. The use of the stimulation device 1 is thus not limited to the female clitoris 11, instead stimulation device 1 can be used on all body parts or erogenous zones (such as the inside of the upper thighs, the loins, neck, nipples, etc.), which can be stimulated by means of media- or air-pressure massage and/or negative-pressure.

Due to being placed on the body part 11 to be stimulated, the second chamber 4 forms a chamber largely or completely sealed off from the exterior of pressure field generator 2, which is only still connected to the second chamber via connection element 5, wherein the edges of chamber 4 ideally form an air-tight bond with the surface of body part 11. Two communicating chambers 3 and 4 are created in this way, wherein corresponding pressure equalization via connection element 5 ensues between chambers 3 and 4 in the event of a volume modification in one of chambers 3 or 4.

Wall 31 of the first chamber 3 is secured by means of a holder 32. Holder 32 is in turn attached to housing 8. Wall 41 of the second chamber is further affixed to holder 32. Two mutually aligned openings in wall 41 of the second chamber and of holder 32 jointly form connection element 5, which connects the first chamber 3 and the second chamber 4. Wall 31, holder 32 and wall 41 are preferably adhered to each other media- or air-tightly. Alternatively, the latter can also be press-fitted or screwed together with each other (for example by means of sealing areas between housing 8 and the respective part). Holder 32 can also be adhered or screwed onto housing 8, for example.

Wall 31 of the first chamber 3 preferably consists of a flexible media- or airtight material, such as rubber. Holder 32 preferably consists of a rigid plastic, which is just as media- and airtight. Wall 41 of the second chamber is preferably made of a flexible, skin-friendly material, such as silicone or rubber.

FIG. 5 shows pressure field generator 2 of FIG. 4 in a second state, wherein the second chamber 4 is in turn placed on the body part 11 to be stimulated. The second state is characterized in that a force A affecting the first chamber 3 causes chamber 3 to expand. In detail, force A in this embodiment draws wall 31 of the first chamber 3 in a direction facing away from the second chamber 4.

Volume V2 in chamber 3 increases as a result, i.e., V2>V1. To equalize the difference in pressure created between chambers 3 and 4, the media or air now flows from the second chamber 4 into the first chamber 3.

Assuming that the first state of the present pressure in chambers 3 and 4 corresponds to the currently prevailing external reference pressure (air pressure for example); the present overall pressure in the second state will now be less than the external reference pressure. This negative-pressure is designed in such a way that it is preferably less than the usual systolic blood pressure in the blood vessels of body part 11. The blood circulation in this area thus increases and clitoris 12 is better supplied with blood in the second state.

FIG. 6 shows pressure field generator 2 in a third state, wherein the second chamber 4 is in turn placed on the body part 11 to be stimulated. The third state is characterized in that a force B influencing the first chamber 3 causes a volume reduction or compression in chamber 3. In detail, the direction of force B is opposed to the direction of force A and distorts wall 31 of the first chamber in such a way that the resulting volume V3 of the chamber is less than volume V1. The compression of chamber 3 causes a positive-pressure in chamber 3, which is equalized by a media- or airflow through connection element 5 in the direction of the second chamber 4.

This media flow is now preferably directed by the orientation of opening 51 and/or of connection element 5 towards the body part 11 to be stimulated, in particular towards the glans of clitoris 12. The indirect (pressure) massage ensues due to the medium flowing onto body part 11. The size of opening 51 is dimensioned in such a way that it is small enough in ratio to the volume displaced in the first chamber 3 to sufficiently accelerate the medium for a perceptible massage effect.

Furthermore, the type of flow can not only be advantageously influenced by the size and orientation of opening 51, but also by the inner configuration of the connection element. For example, helix-shaped grooves in connection element 5 can cause the flow to swirl, wherein the flow profile of the flow unfurls a "softer" or more turbulent effect on the body part to be stimulated. Alternatively, the resulting pressure field in the second chamber 4 can be adjusted by means of a plurality of openings 51, depending on use.

The advantageous factor of the arrangement shown in FIGS. 4 to 6 is that it is hygienically unproblematic (due to the avoidance of dead spaces, for example) and is simple to produce. For example, no valves or other openings in or on the first chamber 3 are required.

Figure 7:
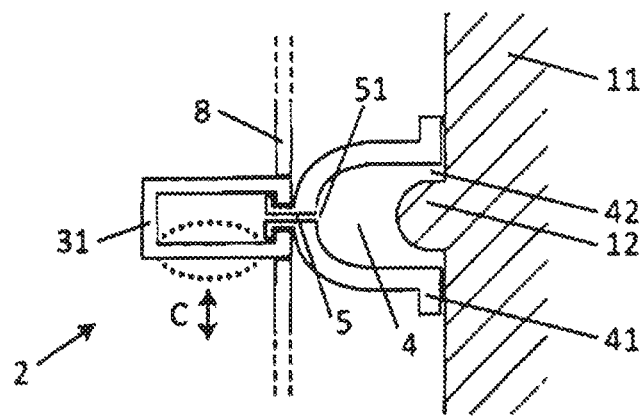
FIG. 7 a cross-section through section A-A of a pressure field generator of the stimulation device shown in FIG. 1 according to a second aspect of the present invention.

FIG. 7 shows one embodiment of an alternative construction of pressure field generator 2. Walls 31 and 41 of the first and second chambers 3 and 4 respectively can thus engage with one another in such a way that they also form two communicating chambers with a connection element 5, as in the first aspect of the construction of pressure field generator 2. Thus, the separate holder is no longer required, while the second chamber 4 is replaceable. In addition, connection element 5 can be designed integrally or in one-piece with wall 41 of the second chamber 4. A replaceable chamber 4 has the advantage of allowing the use of any shapes of chamber 4 adjusted to the respective body part (a more detailed description thereof is provided later), without the entire stimulation device 1 needing to be replaced. Alternatively, the second chamber 4 can also be pluggably affixed to housing 8 (not shown in more detail). Wall 31 of the first chamber 3 can be adhered or screwed onto housing 8, for example.

Also, as shown in more detail in FIG. 7 by the broken line and double arrow C, the first chamber 3 is expanded and compressed by a force exerted perpendicularly to the axial direction of connection element 5. In principle, the force exerted directly or indirectly on the first chamber 3 by drive unit 6 can be exerted from any direction. The only decisive criterion here is that the volume of the first chamber 3 can be increased and decreased by drive unit 6.

Figure 8:
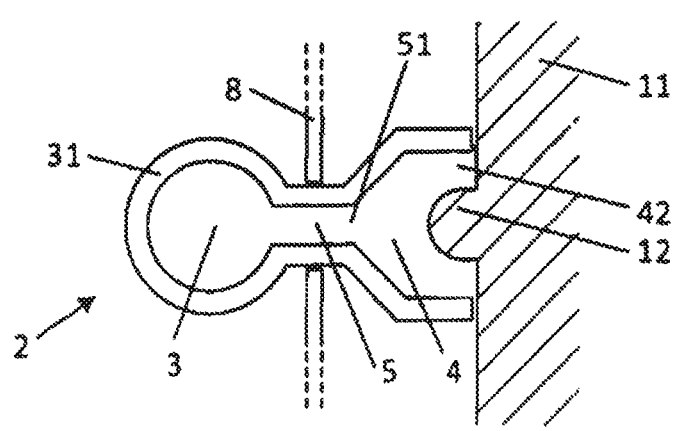
FIG. 8 a cross-section through section A-A of a pressure field generator of the stimulation device shown in FIG. 1 according to a third aspect of the present invention.

FIG. 8 shows one embodiment of an integral or one-piece structure of pressure field generator 2. An elastic material, such as silicone or rubber, can be used as material for chambers 3 and 4. The advantage here is that any hygienically unsafe divide is avoided and the production effort is reduced. Pressure field generator 2 can be adhered or screwed onto housing 8 in this case too. Any modification of the volume in the first chamber 3 is analogous here, as described in conjunction with FIG. 7.

Figure 9:
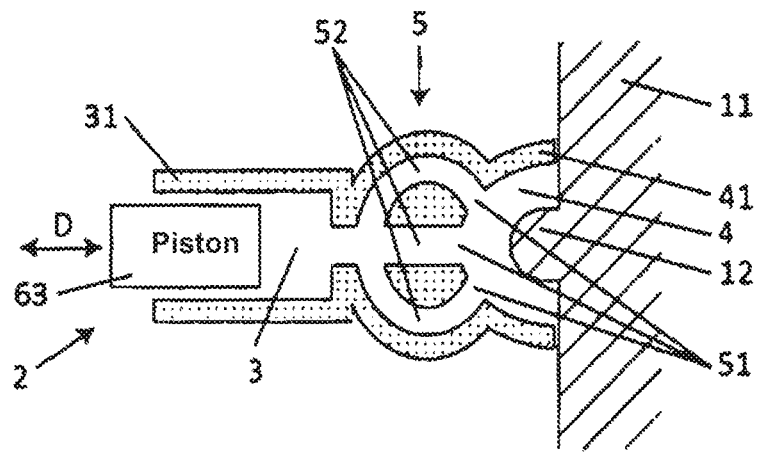
FIG. 9 a cross-section through section A-A of a pressure field generator of the stimulation device shown in FIG. 1 according to a fourth aspect of the present invention.

FIG. 9 shows one embodiment of an alternative construction of pressure field generator 2. The second chamber 4, a plurality of connection elements 5, as well as partial sections of wall 31 of the first chamber 3 are designed in one-piece. Alternatively, pressure field generator 2 can be constructed in two or more pieces from individual components, while safeguarding the geometrical example of FIG. 9 in a similar way to that shown in FIG. 4 or 7.

The volume in chamber 3 is modified in a similar way to a piston pump, although no valves are available here. A piston 63 is thus moved backwards and forwards by the drive unit, for example an electric motor or electromagnet, in the directions of the double arrow D. This type of drive has the advantage that the volume of the first chamber 3 can be simply reduced to zero or almost zero, thus allowing the first chamber 3 to be almost completely emptied.

The embodiment of connection element 5, with a plurality of channels 52 and openings 51, leads to a distribution of the pressure field to a plurality of concentration points. While the embodiment of connection element 5 with only one channel, as described in conjunction with FIG. 6, leads to the formation of a strongly concentrated media- or airflow on a target area, the embodiment of connection element 5 shown in FIG. 9 allows the media- or airflow to be distributed to a plurality of target areas, thus allowing clitoris 11 to be blown not just on its glans, but equally from a plurality of directions as well, for example. Depending on use, this distribution of the airflow concentration to a plurality of areas can help to avoid any overstimulation and/or help to increase the stimulation area.

FIGS. 10a to 10c show (partial) cross-sections of one embodiment of a construction of pressure field generator 2 with a bending element 64 as drive for modifying the volume in the first chamber 3. Bending element 64 can, for example, be a conventional piezoelectric bending element, which distorts or bends once voltage is applied. In this embodiment wall 31 of the first chamber 3 is a rigid or stiff construction, while bending element 64 is suitably dovetailed to the sides of the first chamber 3. The transition points between bending element 64 and wall 31 are sealed (elastically bonded for example). The drive for pressure field generator 2 is already integrated in this construction and an external drive is not required. An electric motor with an eccentric is not needed, for example. This allows, inter alia, the reduction of any disturbing natural oscillations due to the eccentric movement of the stimulation device.

In detail, FIG. 10a shows pressure field generator 2 with bending element 64 in a neutral position. Thus, the volume of the first chamber 3 with bending element 64 in the neutral position is the standard volume. FIG. 10b also shows the first chamber 3 with an excited and, consequently, outwardly bent bending element, while the volume of the first chamber 3 is increased, with a negative-pressure consequently prevailing in pressure field generator 2. FIG. 10c shows a bending element of the first chamber 3 excited in the opposite direction to FIG. 10b, which is why the volume in the first chamber 3 has decreased, with an positive-pressure consequently prevailing in pressure field generator 2.

FIG. 11 shows one embodiment with a locally separated arrangement of chambers 3 and 4 of pressure field generator 2. Chambers 3 and 4 are connected via an extended connection element 5, which can be a longer flexible hose or even a rigid pipe. For example, connection element 5 may be 0.5 m in length. This enables housing 8 to be held in one hand, while the other hand holds the second chamber 4 on the body part 11 to be stimulated; or one can simply lay housing 8 aside, while the user holds only the second chamber 4 in his/her hands. The stimulation device in this embodiment can also be designed as a table device.

FIGS. 12 *a*) to 12 *f*) show various bottom and side views of other aspects of the second chamber 4 in accordance with one or more embodiments. In detail, FIG. 12 *a*) shows a bottom view of a circular second chamber 4 with a centrally arranged opening 51; FIG. 12 *b*) a bottom view of a triangular second chamber 4 with a centrally arranged opening 51; FIG. 12 *c*) a bottom view of an oval second chamber 4 with a centrally arranged opening 51; and FIG. 12 *d*) a bottom view of an almost eight-shaped second chamber 4 with two openings 51 shifted to the center. FIG. 12 *e*) further shows a side cross-section of a second chamber 4, wherein the second chamber 4 has an additional extended contact surface 43 to the skin or a support part 43 to improve the sealing function of the second chamber 4 on the skin. The extended contact surface 43 may also have grooves or projections that improve the sealing function even more. FIG. 12 *f*) shows a side cross-section of a second chamber 4 with a plurality of separate connection elements 5 and an extended contact surface due to support part 43.

In principle, the form of the second chamber 4 can thus be adjusted to the anatomy of the erogenous zone to be stimulated. The form of chamber 4 in FIG. 12 *a*) is, for example, adjusted to the round shape of the breast, while the form of chamber 4 in FIG. 12 *c*) is better suited to the form of the female vulva. Furthermore, the shape of the second chamber 4 also determines the characteristic of the pressure field. The size of the second chamber 4 in ratio the volume displaced from chamber 3 thus determines the amount of the achievable negative- or positive-pressure. Furthermore, the proximity of opening 51 of connection element 5 to the area of skin to be stimulated can also be used to determine the intensity of the massage effect on said area of skin. A plurality of openings 51, cf. FIG. 12 *d*) allows the massage effect to be distributed to a plurality of areas. Thus, for example, the clitoris can be less directly stimulated at the very sensitive clitoris glans (cf. FIG. 12 e), and more stimulated at the areas surrounding the clitoris glans, in order to prevent overstimulation of the clitoris.

Figure 13:
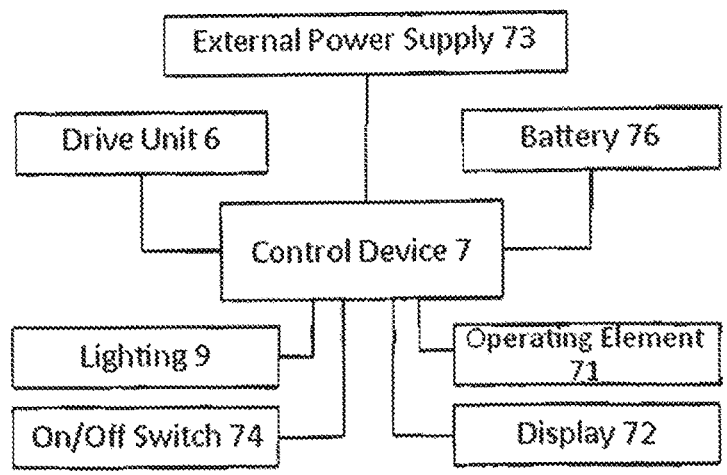
FIG. 13 a block diagram of an embodiment of the present invention.

FIG. 13 shows a block diagram of an example of the functional construction of an embodiment with a control device 7, a drive unit 6, lighting 9, an on/off switch 74, operating elements 71, a battery 76 and an external power supply 73.

Control device 7, which has a microcontroller or is hardwired, for example, initially controls the power supply of all users of stimulation device 1, as well as an optional charging and discharging process of battery 76 and/or a battery management. In particular, control device 7 controls the excitation of drive unit 6, such as the size of the deflection, the frequency, the modulation, etc.

Furthermore, control device 7 may have a memory in which at least one modulation or stimulation pattern (described in more detail in conjunction with FIG. 14 a) to c)) is saved. The excitation of drive unit 6 can now be activated via operating elements 71 in compliance with the previously saved stimulation pattern at the discretion of the user of stimulation device 1. The stimulation pattern of the pressure field can also be optionally and individually adjusted and saved by the user via the operating elements.

Figure 14A:
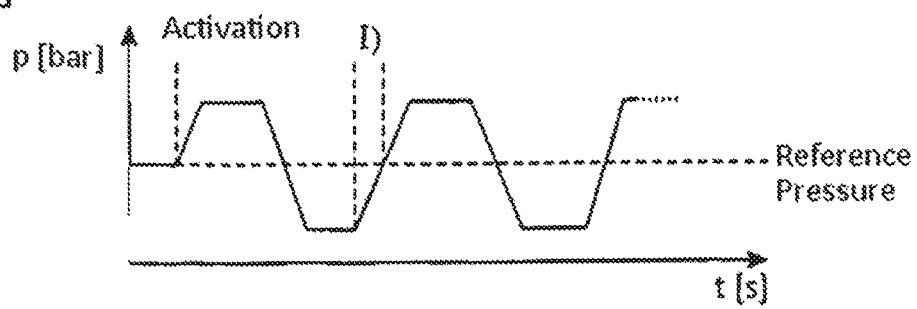
FIGS. 14 a) to c) diagrams of various pressure modulation patterns of the present invention.
Figure 14B:
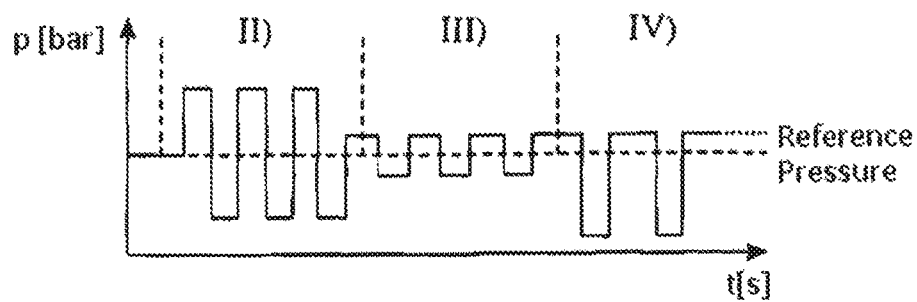
Figure 14C:
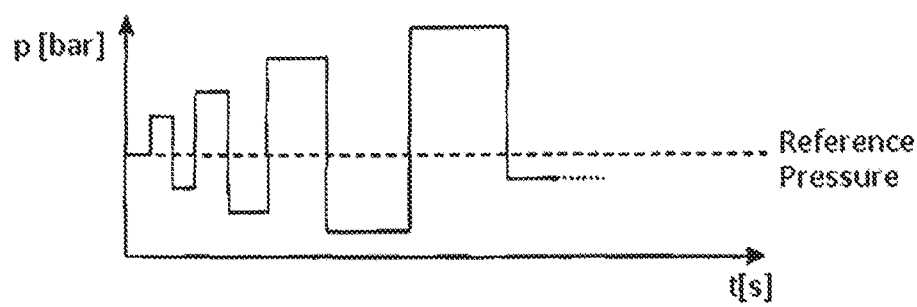

FIG. 14 a) shows the chronological sequence of a total pressure p in the pressure field generator (2) when using the latter for stimulation. The broken line provides the reference pressure, such as the currently prevailing atmospheric pressure that exists outside the pressure field generator (2). If the second chamber 4 is now placed on body part 11 to be stimulated, the originally prevailing ambient pressure in the pressure field generator (2) is maintained, for example. It is now assumed that the second chamber 4 is sealed tightly to the body part to be stimulated for the most part. Once the stimulation device is activated, drive unit 6 is activated or excited by control device 7 according to a previously saved stimulation pattern. Accordingly, the volume of the first chamber 3 and thus the total pressure in pressure field generator 2 are modified, with the pressure modifications being modified to the reference pressure. The pressure or stimulation pattern shown as an example in FIG. 14 a) develops a pulsed, regular pressure field. In phases of pressure increase, the erogenous zone to be stimulated is blown on or massaged, while in the times when a negative-pressure prevails, the blood circulation of body part 11, the clitoris for example, is promoted. Thus, time periods exist (designated in FIG. 14 a) as I)) in which a negative-pressure prevails, while the clitoris is simultaneously indirectly massaged.

FIG. 14 b) shows three examples of alternative stimulation patterns. Thus, the area designated as II) shows a pulsed stimulation pattern with high amplitude. The area designated as III) shows a pulsed stimulation pattern with low amplitude. Furthermore, the area designated as IV) illustrates an irregular and asymmetrical stimulation pattern as regards chronological sequence and amplitude. The patterns can be varied according to individual bodily effect/use and according to individual wishes.

FIG. 14 c) shows another example of an alternative stimulation pattern. The strength of pressure may, for example, increase with time, in order to adjust to the user's state of excitement.

In addition to the explained embodiments, other basic design principles are allowed. For example, different arrangements or constructions of the first chamber 3 may be arbitrarily combined with various embodiments of the second chamber 4 or connection element 5. For example, the first chamber 3 with the drive in FIG. 10 can be combined with the second chamber in FIG. 12 f).

Although only one first chamber 3 is shown in all embodiments, two or more first chambers 3 may be present, which are then appropriately activated simultaneously or time-delayed in such a way that their volume is modified in order to build up a pressure field.

Although only one opening from the first chamber 3 to connection element 5 is shown in all embodiments, a plurality of openings for a connection element 5 or even more openings for a plurality of connection elements 5 may be present in the first chamber 3.

A stimulation device 1 can have a plurality of pressure field generator 2. Thus, for example, two pressure field generators may be available to stimulate two erogenous zones simultaneously.

The stimulation patterns can deviate from the patterns shows in FIGS. 14 a), b) and c), as long as they have a chronological sequence of over- and negative-pressures. For example, a relatively long-lasting negative-pressure can initially be built up at the beginning or after activation of the device (3 minutes for example), in order to effectively increase the blood circulation of the zone to be stimulated, whereupon pulsed negative- and over-pressures of a slowly increasing amplitude then follow.

LIST OF REFERENCE NUMERALS

1 Stimulation device
2 Pressure field generator
3 First chamber
4 Second chamber
5 Connection element
6 Drive unit
7 Control device
8 Housing
9 Lighting
11 Body part
12 Clitoris
31 Wall of first chamber
32 Holder
41 Wall of second chamber
42 Opening of second chamber
43 Contact surface
51 Opening of connection element to second chamber
61 Drive shaft
62 Eccentric
63 Piston
64 Bending element
71 Operating element
72 Display
73 Power supply
74 On/off switch
75 Socket
76 Battery
77 Control board

The invention claimed is:

1. A stimulation device comprising:
a chamber having a flexible wall;
a drive unit in physical communication with the flexible wall to cause at least a portion of the flexible wall to deflect in opposing directions, thereby resulting in a changing volume of the chamber, the changing volume of the chamber resulting in modulated positive and negative pressures with respect to an ambient pressure;

an opening configured to sealingly engage a portion of a body of a user including a clitoris, the modulated positive and negative pressures to be applied to the portion of the body via the opening, the opening being a sole opening of the chamber to an exterior of the stimulation device, the flexible wall to sealingly separate the drive unit from the portion of the body;

a control device configured to receive input from the user and control the drive unit to create the modulated positive and negative pressures; and a housing enclosing the drive unit and the control device.

2. The stimulation device of claim 1, wherein the modulated positive and negative pressures are to affect a flow of blood to the clitoris.

3. The stimulation device of claim 1, wherein the opening is configured to be placed over a clitoris glans.

4. The stimulation device of claim 1, wherein the flexible wall is integral with the chamber.

5. The stimulation device of claim 1, wherein the flexible wall includes silicone.

6. The stimulation device of claim 1, wherein the stimulation device is a portable hand-held device including a battery.

7. The stimulation device of claim 1, wherein the housing includes a water resistant material.

8. The stimulation device of claim 7, wherein the water resistant material includes acrylonitrile butadiene styrene (ABS).

9. The stimulation device of claim 1, further including an operating element in communication with the drive unit to cause the drive unit to adjust the creation of the modulated positive and negative pressures.

10. The stimulation device of claim 1, wherein the opening extends through a flexible material.

11. The stimulation device of claim 10, wherein the flexible material includes silicone.

12. The stimulation device of claim 10, wherein at least a portion of the flexible material protrudes from the housing.

13. The stimulation device of claim 10, wherein the flexible wall and the flexible material form one piece.

14. The stimulation device of claim 10, wherein the flexible wall includes a first material and the flexible material includes a second material different from the first material.

15. The stimulation device of claim 1, wherein the opening has a first width defined by an edge of the opening that is to contact the portion of the body, and a portion of the housing including the flexible wall has a second width, the second width greater than the first width.

16. The stimulation device of claim 1, wherein the drive unit is to selectively cause the flexible wall to deflect based on a first stimulation pattern or a second stimulation pattern.

17. A stimulation device comprising:

a pressure field generator including a flexible wall;

a drive unit in physical communication with the flexible wall to cause at least a portion of the flexible wall to deflect in opposing directions, thereby resulting in a changing volume of the pressure field generator, the changing volume of the pressure field generator resulting in modulated positive and negative pressures with respect to an ambient pressure;

an opening configured to sealingly engage a portion of a body of a user including a clitoris, the modulated positive and negative pressures to be applied to the portion of the body via the opening, the opening being a sole opening of the pressure field generator to an exterior of the stimulation device, the flexible wall to sealingly separate the drive unit from the portion of the body;

a control device configured to receive input from the user and control the drive unit to create the modulated positive and negative pressures; and a housing enclosing the drive unit and the control device.

18. The stimulation device of claim 17, wherein the modulated positive and negative pressures are to affect a flow of blood to the clitoris.

19. The stimulation device of claim 17, wherein the opening is configured to be placed over a clitoris glans.

20. The stimulation device of claim 17, wherein the flexible wall is integral with the pressure field generator.

21. The stimulation device of claim 17, wherein the flexible wall includes silicone.

22. The stimulation device of claim 17, wherein the stimulation device is a portable hand-held device including a battery.

23. The stimulation device of claim 17, wherein the housing includes a water resistant material.

24. The stimulation device of claim 23, wherein the water resistant material includes acrylonitrile butadiene styrene (ABS).

25. The stimulation device of claim 17, further including an operating element in communication with the drive unit to cause the drive unit to adjust the creation of the modulated positive and negative pressures.

26. The stimulation device of claim 17, wherein at least a portion of the pressure field generator protrudes from the housing.

27. The stimulation device of claim 26, wherein the portion of the pressure field generator protruding from the housing includes a flexible material.

28. The stimulation device of claim 27, wherein the flexibility of the material of the portion of the pressure field generator protruding from the housing is greater than a flexibility of a material of the housing.

29. The stimulation device of claim 26, wherein the flexible wall and the portion of the pressure field generator protruding from the housing form an integral surface.

30. The stimulation device of claim 26, wherein the flexible wall includes a first material and the at least the portion of the pressure field generator protruding from the housing includes a second material different than the first material.

31. The stimulation device of claim 17, wherein at least a portion of the flexible wall is supported by the housing.

* * * * *

UNITED STATES PATENT AND TRADEMARK OFFICE
CERTIFICATE OF CORRECTION

Page 1 of 1

PATENT NO.         : 11,090,220 B2
APPLICATION NO.    : 15/965117
DATED              : August 17, 2021
INVENTOR(S)        : Michael Lenke It is certified that error appears in the above-identified patent and that said Letters Patent is hereby corrected as shown below:

On the Title Page

In the Assignee name, Replace "NOVOLUTO GBHH" with "NOVOLUTO GMBH"

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*